United States Patent
Sankaranarayanan et al.

(10) Patent No.: US 10,395,381 B2
(45) Date of Patent: Aug. 27, 2019

(54) METHOD TO COMPUTE SLIDING WINDOW BLOCK SUM USING INSTRUCTION BASED SELECTIVE HORIZONTAL ADDITION IN VECTOR PROCESSOR

(71) Applicant: TEXAS INSTRUMENTS INCORPORATED, Dallas, TX (US)

(72) Inventors: Jayasree Sankaranarayanan, Kerala (IN); Dipan Kumar Mandal, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/291,405

(22) Filed: Mar. 4, 2019

(65) Prior Publication Data
US 2019/0197718 A1 Jun. 27, 2019

Related U.S. Application Data

(63) Continuation of application No. 14/931,322, filed on Nov. 3, 2015, now abandoned.

(30) Foreign Application Priority Data

Nov. 3, 2014 (IN) .......................... 5508/CHE/2014

(51) Int. Cl.
*G06T 7/60* (2017.01)
*G06F 9/38* (2018.01)
*G06F 9/30* (2018.01)
*G06T 1/20* (2006.01)
*G06F 17/16* (2006.01)

(52) U.S. Cl.
CPC .............. *G06T 7/60* (2013.01); *G06F 9/3001* (2013.01); *G06F 9/3012* (2013.01); *G06F 9/3013* (2013.01); *G06F 9/30036* (2013.01); *G06F 9/3887* (2013.01); *G06F 9/3891* (2013.01); *G06F 17/16* (2013.01); *G06T 1/20* (2013.01); *G06T 2200/28* (2013.01)

(58) Field of Classification Search
None
See application file for complete search history.

(56) References Cited

U.S. PATENT DOCUMENTS

| | | | |
|---|---|---|---|
| 6,115,812 A * | 9/2000 | Abdallah | G06F 9/30014 708/520 |
| 2001/0021941 A1 | 9/2001 | Arakawa et al. | |
| 2003/0123748 A1 | 7/2003 | Sebot et al. | |
| 2004/0059889 A1 | 3/2004 | Macy et al. | |
| 2004/0073589 A1 | 4/2004 | Debes et al. | |

(Continued)

OTHER PUBLICATIONS

Collins, Robert, "Lecture 4: Smoothing." CSE486 Computer Vision I, Penn State University, Feb. 1, 2009, www.cse.psu.edu/~rtc12/CSE486/. 50 pages.

*Primary Examiner* — Ryan P Potts
(74) *Attorney, Agent, or Firm* — Kenneth Liu; Charles A. Brill; Frank D. Cimino

(57) ABSTRACT

Disclosed techniques relate to forming a block sum of picture elements employing a vector dot product instruction to sum packed picture elements and the mask producing a vector of masked horizontal picture element. The block sum is formed from plural horizontal sums via vector single instruction multiple data (SIMD) addition.

20 Claims, 15 Drawing Sheets

(56) References Cited

U.S. PATENT DOCUMENTS

| | | | |
|---|---|---|---|
| 2004/0267856 A1* | 12/2004 | Macy, Jr. | G06F 9/30014 708/524 |
| 2004/0267858 A1 | 12/2004 | Macy et al. | |
| 2005/0013363 A1* | 1/2005 | Cho | H04N 19/105 375/240.12 |
| 2005/0117653 A1* | 6/2005 | Sankaran | H04N 19/159 375/240.24 |
| 2007/0071106 A1* | 3/2007 | Graham | G06F 9/30003 375/240.24 |
| 2007/0220525 A1* | 9/2007 | State | G06F 9/4881 718/107 |
| 2007/0294514 A1* | 12/2007 | Hosogi | G06F 9/30014 712/212 |
| 2008/0140994 A1* | 6/2008 | Khailany | G06F 9/30014 712/205 |
| 2009/0049113 A1 | 2/2009 | Muff et al. | |
| 2011/0153707 A1 | 6/2011 | Ginzburg et al. | |
| 2014/0195783 A1 | 7/2014 | Karthikeyan et al. | |
| 2014/0365747 A1* | 12/2014 | Ould-Ahmed-Vall | G06F 9/30036 712/4 |
| 2015/0082004 A1* | 3/2015 | Rahman | G06F 9/30014 712/208 |
| 2015/0125085 A1 | 5/2015 | Gupta | |

\* cited by examiner

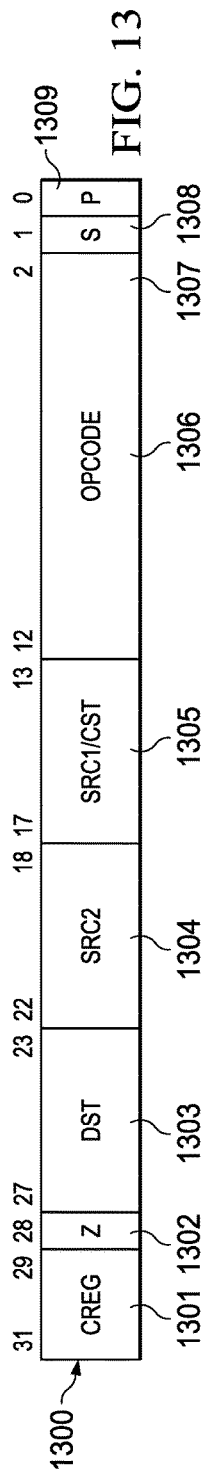
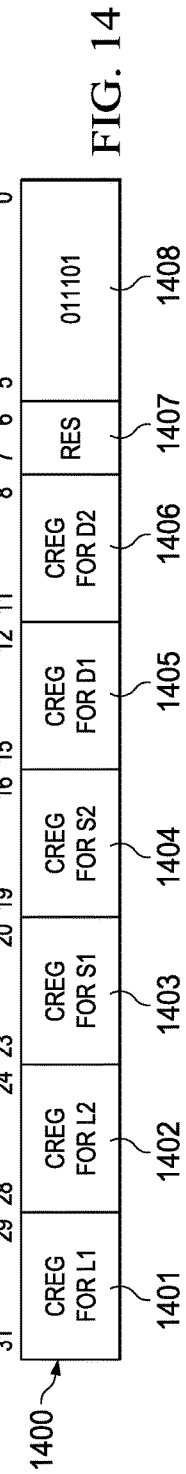
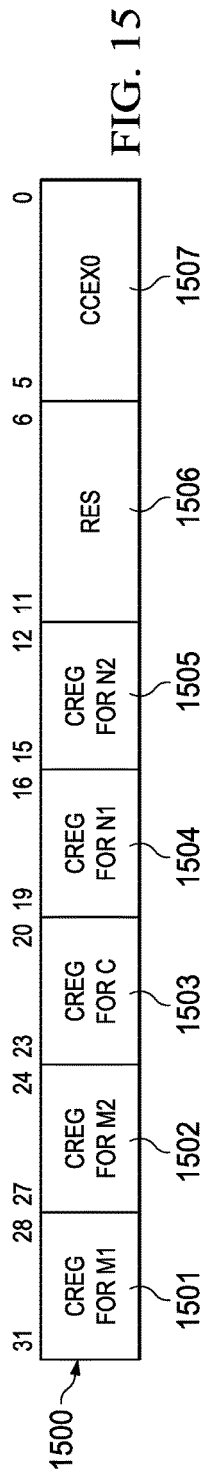
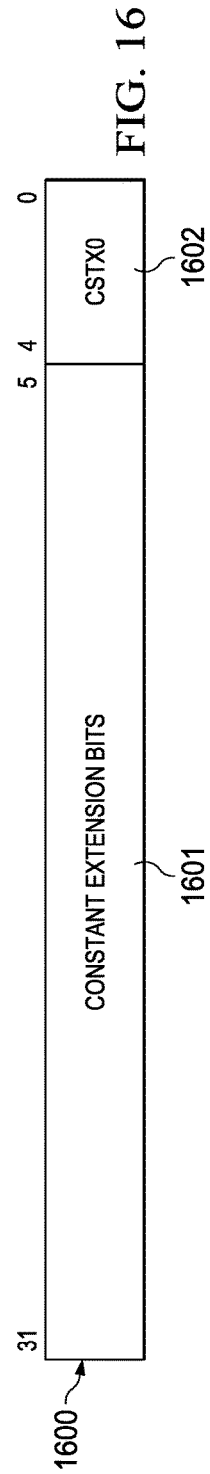

METHOD TO COMPUTE SLIDING WINDOW BLOCK SUM USING INSTRUCTION BASED SELECTIVE HORIZONTAL ADDITION IN VECTOR PROCESSOR

CROSS-REFERENCE TO RELATED APPLICATION(S)

This application is a continuation of U.S. patent application Ser. No. 14/391,222 filed on Nov. 3, 2015, which claims priority to Indian Provisional Application No. 5508/CHE/2014 filed on Nov. 3, 2014, all of which are incorporated herein by reference.

TECHNICAL FIELD

The technical field of this invention is digital data processing and more specifically computing a sliding window block sum.

BACKGROUND

A two dimensional Block Sum computation is performed by summation of every element contained in a block of size m×n which lies within a matrix of size M×N, where M>m and N>n. When the block sum is computed for a window of size m×n around every element of a matrix of size M×N, creating a new matrix of dimensions (M−m+1)×(N−n+1) replacing every element of the original matrix with the block sum of the window around it, this is called a sliding window block sum computation.

Sliding window block sum computation is an important common step in many key low level vision kernels. In the Harris Corner Detection algorithm (described in C. Harris and M. Stephens, "A Combined Corner and Edge Detector," Alvey Vision Conference, 1988), the block sum of squares of pixel intensity gradients of a sub-window around every pixel needs to be computed for identifying the sub-window which is potentially, a good corner. Thus this block sum of squares of pixel intensity gradients is a good feature to track. Similarly in a ORB feature detection and description algorithm (E. Rublee, V. Rabaud, K. Konolige, G. Bradski, "ORB: An Efficient Alternative to SIFT or SURF," ICCV, 2564-2571, 2011), every pixel in the window region around an identified feature is smoothened by substituting a 5×5 block sum around that pixel. Such examples of sliding window block sum calculations are numerous in embedded vision space.

Given the importance of sliding window block sum computation in vision applications, a fast technique to compute block sums for a sliding window would speed up performance of many vision kernels. Since vision algorithms typically involve similar computation tasks across huge image blocks or across the entire image and also need to operate at high frames per second (FPS). Vector single instruction multiple data (SIMD) engines are best suited for solving vision tasks. In these applications high capacity vector processing can boost performance.

SUMMARY

This invention forms a block sum of picture elements employing a vector dot product instruction to sum packed picture elements and the mask producing a vector of masked horizontal picture element. The block sum is formed from plural horizontal sums via vector single instruction multiple data (SIMD) addition.

BRIEF DESCRIPTION OF THE DRAWINGS

These and other aspects of this invention are illustrated in the drawings, in which:

FIG. 13 illustrates an example of the instruction coding of instructions used by this invention;

FIG. 14 illustrates the bit coding of a condition code extension slot 0;

FIG. 15 illustrates the bit coding of a condition code extension slot 1;

FIG. 16 illustrates the bit coding of a constant extension slot 0;

DETAILED DESCRIPTION

Figure 1:
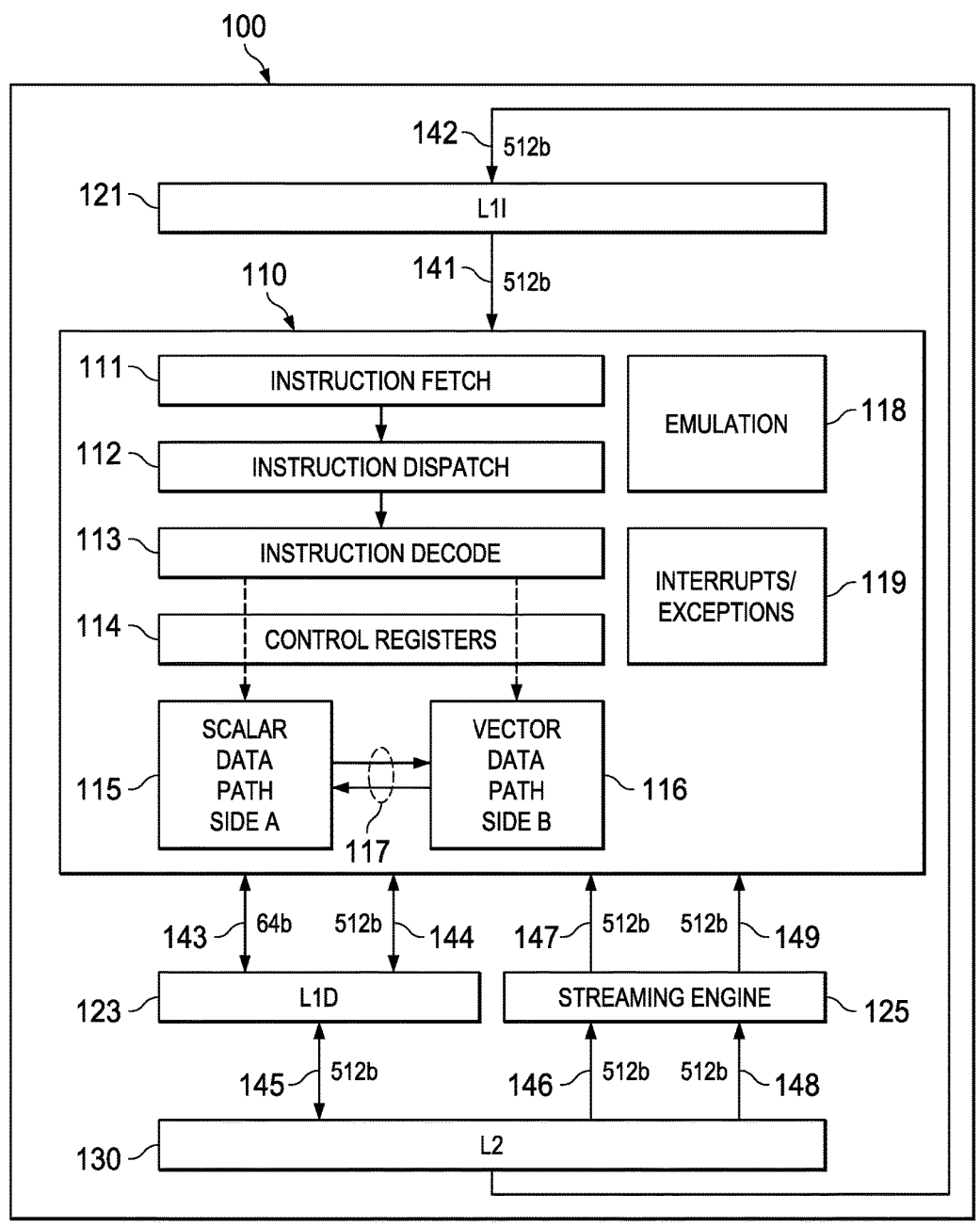
FIG. 1 illustrates a dual scalar/vector datapath processor according to one embodiment of this invention.

FIG. 1 illustrates a dual scalar/vector datapath processor according to a preferred embodiment of this invention.

Processor 100 includes separate level one instruction cache (L1I) 121 and level one data cache (L1D) 123. Processor 100 includes a level two combined instruction/data cache (L2) 130 that holds both instructions and data. FIG. 1 illustrates connection between level one instruction cache 121 and level two combined instruction/data cache 130 (bus 142). FIG. 1 illustrates connection between level one data cache 123 and level two combined instruction/data cache 130 (bus 145). In the preferred embodiment of processor 100 level two combined instruction/data cache 130 stores both instructions to back up level one instruction cache 121 and data to back up level one data cache 123. In the preferred embodiment level two combined instruction/data cache 130 is further connected to higher level cache and/or main memory in a manner not illustrated in FIG. 1. In the preferred embodiment central processing unit core 110, level one instruction cache 121, level one data cache 123 and level two combined instruction/data cache 130 are formed on a single integrated circuit. This signal integrated circuit optionally includes other circuits.

Central processing unit core 110 fetches instructions from level one instruction cache 121 as controlled by instruction fetch unit 111. Instruction fetch unit 111 determines the next instructions to be executed and recalls a fetch packet sized set of such instructions. The nature and size of fetch packets are further detailed below. As known in the art, instructions are directly fetched from level one instruction cache 121 upon a cache hit (if these instructions are stored in level one instruction cache 121). Upon a cache miss (the specified instruction fetch packet is not stored in level one instruction cache 121), these instructions are sought in level two combined cache 130. In the preferred embodiment the size of a cache line in level one instruction cache 121 equals the size of a fetch packet. The memory locations of these instructions are either a hit in level two combined cache 130 or a miss. A hit is serviced from level two combined cache 130. A miss is serviced from a higher level of cache (not illustrated) or from main memory (not illustrated). As is known in the art, the requested instruction may be simultaneously supplied to both level one instruction cache 121 and central processing unit core 110 to speed use.

Instruction dispatch unit 112 determines the target functional unit of each fetched instruction. Instruction dispatch unit 112 directs each instruction to its target functional unit. In the preferred embodiment of this invention, central processing unit core 110 includes plural functional units to perform instruction specified data processing tasks. The functional unit assigned to an instruction is completely specified by the instruction produced by a compiler. The hardware of central processing unit core 110 has no part in this functional unit assignment. In the preferred embodiment instruction dispatch unit 112 may operate on plural instructions in parallel. The number of such parallel instructions is set by the size of an execute packet including the instructions. This will be further detailed below.

One part of the dispatch task of instruction dispatch unit 112 is determining whether the instruction is to execute on a functional unit in scalar datapath side A 115 or vector datapath side B 116. An instruction bit within each instruction called the s bit determines which datapath the instruction controls. This will be further detailed below.

Instruction decode unit 113 decodes each instruction in a current execute packet. Decoding includes identification of the functional unit performing the instruction, identification of registers used to supply data for the corresponding data processing operation from among possible register files and identification of the register destination of the results of the corresponding data processing operation. The result of this decoding is signals for control of the target functional unit to perform the data processing operation specified by the corresponding instruction.

Central processing unit core 110 includes control registers 114. Control registers 114 store information for control of the functional units in scalar datapath side A 115 and vector datapath side B 116. This information could be mode information or the like.

The decoded instructions from instruction decode 113 and information stored in control registers 114 are supplied to scalar datapath side A 115 and vector datapath side B 116. As a result functional units within scalar datapath side A 115 and vector datapath side B 116 perform instruction specified data processing operations upon instruction specified data and store the results in an instruction specified data register or registers. Each of scalar datapath side A 115 and vector datapath side B 116 include plural functional units that preferably operate in parallel. These will be further detailed below in conjunction with FIG. 2. There is a datapath 117 between scalar datapath side A 115 and vector datapath side B 116 permitting data exchange.

Central processing unit core 110 includes further non-instruction based modules. Emulation unit 118 permits determination of the machine state of central processing unit core 110 in response to instructions. This capability will typically be employed for algorithmic development. Interrupts/exceptions unit 119 enable central processing unit core 110 to be responsive to external, asynchronous events (interrupts) and to respond to attempts to perform improper operations (exceptions).

Central processing unit core 110 includes streaming engine 125. Streaming engine 125 supplies two data streams from predetermined addresses typically cached in level two combined cache 130 to operand inputs of functional units of vector datapath side B. This provides controlled data movement from memory (as cached in level two combined cache 130) directly to operand inputs. This is further detailed below.

FIG. 1 illustrates exemplary data widths of busses between various parts. Level one instruction cache 121 supplies instructions to instruction fetch unit 111 via bus 141. Bus 141 is preferably a 512-bit bus. Bus 141 is unidirectional from level one instruction cache 121 to central processing unit 110. Level two combined cache 130 supplies instructions to level one instruction cache 121 via bus 142. Bus 142 is preferably a 512-bit bus. Bus 142 is unidirectional from level two combined cache 130 to level one instruction cache 121.

Level one data cache 123 exchanges data with register files in scalar datapath side A 115 via bus 143. Bus 143 is preferably a 64-bit bus. Level one data cache 123 exchanges data with register files in vector datapath side B 116 via bus 144. Bus 144 is preferably a 512-bit bus. Busses 143 and 144 are illustrated as bidirectional supporting both central processing unit 110 data reads and data writes. Level one data cache 123 exchanges data with level two combined cache 130 via bus 145. Bus 145 is preferably a 512-bit bus. Bus 145 is illustrated as bidirectional supporting cache service for both central processing unit 110 data reads and data writes.

Level two combined cache 130 supplies data of a first data stream to streaming engine 125 via bus 146. Bus 146 is preferably a 512-bit bus. Streaming engine 125 supplies data of this first data stream to operand inputs of functional units of vector datapath side B 116 via bus 147. Bus 147 is preferably a 512-bit bus. Level two combined cache 130 supplies data of a second data stream to streaming engine 125 via bus 148. Bus 148 is preferably a 512-bit bus. Streaming engine 125 supplies data of this second data stream to operand inputs of functional units of vector datapath side B 116 via bus 149. Bus 149 is preferably a 512-bit bus. Busses 146, 147, 148 and 149 are illustrated as unidirectional from level two combined cache 130 to streaming engine 125 and to vector datapath side B 116 in accordance with the preferred embodiment of this invention.

Figure 2:
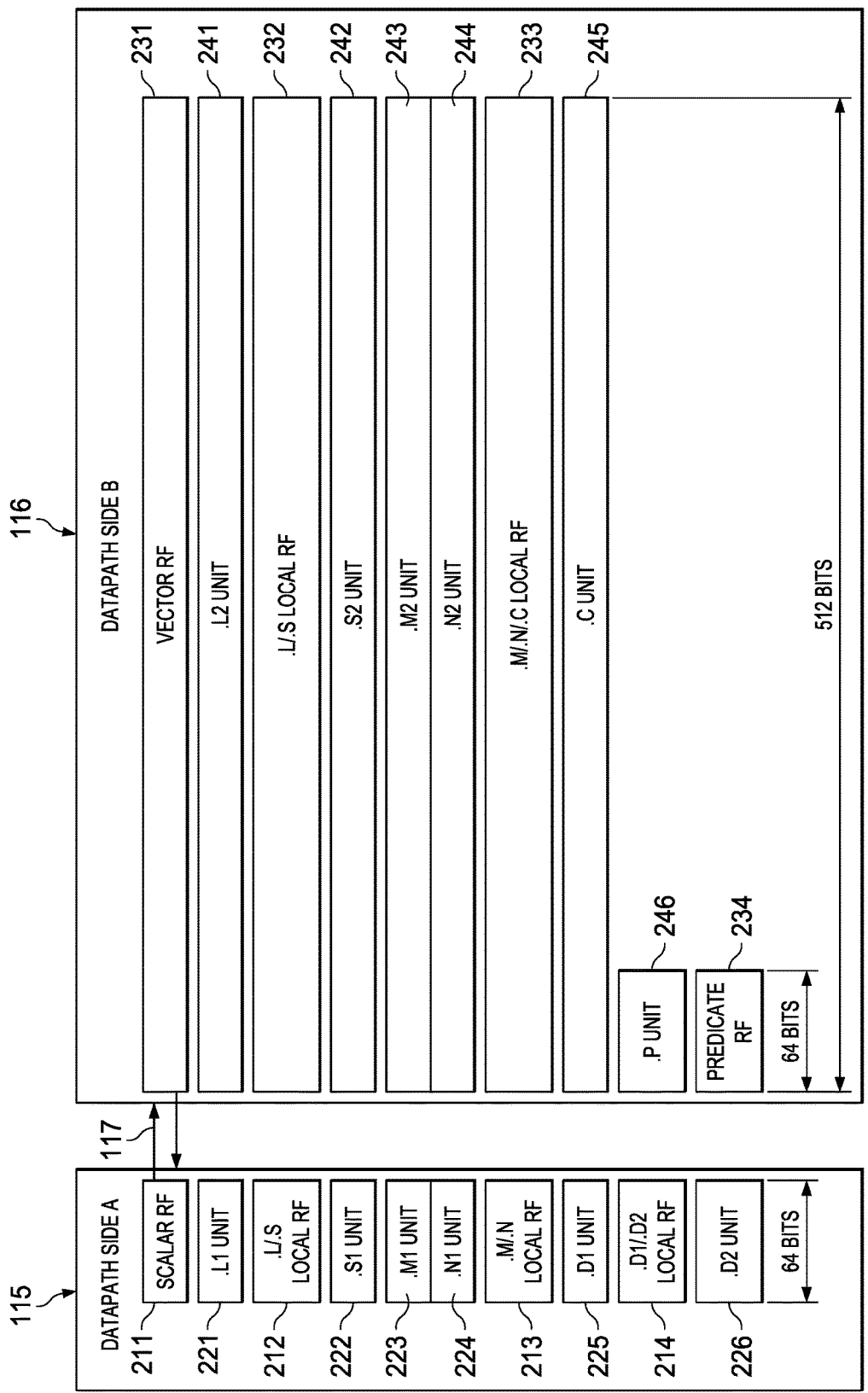
FIG. 2 illustrates registers and functional units in the dual scalar/vector datapath processor illustrated in FIG. 1.

FIG. 2 illustrates further details of functional units and register files within scalar datapath side A 115 and vector datapath side B 116. Scalar datapath side A 115 includes global scalar register file 211, L1/S1 local register file 212, M1/N1 local register file 213 and D1/D2 local register file 214. Scalar datapath side A 115 includes L1 unit 221, S1 unit 222, M1 unit 223, N1 unit 224, D1 unit 225 and D2 unit 226. Vector datapath side B 116 includes global vector register file 231, L2/S2 local register file 232, M2/N2/C local register file 233 and predicate register file 234. Vector datapath side B 116 includes L2 unit 241, S2 unit 242, M2 unit 243, N2 unit 244, C unit 245 and P unit 246. There are limitations upon which functional units may read from or write to which register files. These will be detailed below.

Scalar datapath side A 115 includes L1 unit 221. L1 unit 221 generally accepts two 64-bit operands and produces one 64-bit result. The two operands are each recalled from an instruction specified register in either global scalar register file 211 or L1/S1 local register file 212. L1 unit 221 preferably performs the following instruction selected operations: 64-bit add/subtract operations; 32-bit min/max operations; 8-bit Single Instruction Multiple Data (SIMD) instructions such as sum of absolute value, minimum and maximum determinations; circular min/max operations; and various move operations between register files. The result may be written into an instruction specified register of global scalar register file 211, L1/S1 local register file 212, M1/N1 local register file 213 or D1/D2 local register file 214.

Scalar datapath side A 115 includes S1 unit 222. S1 unit 222 generally accepts two 64-bit operands and produces one 64-bit result. The two operands are each recalled from an instruction specified register in either global scalar register file 211 or L1/S1 local register file 212. S1 unit 222 preferably performs the same type operations as L1 unit 221. There optionally may be slight variations between the data processing operations supported by L1 unit 221 and S1 unit 222. The result may be written into an instruction specified register of global scalar register file 211, L1/S1 local register file 212, M1/N1 local register file 213 or D1/D2 local register file 214.

Scalar datapath side A 115 includes M1 unit 223. M1 unit 223 generally accepts two 64-bit operands and produces one 64-bit result. The two operands are each recalled from an instruction specified register in either global scalar register file 211 or M1/N1 local register file 213. M1 unit 223 preferably performs the following instruction selected operations: 8-bit multiply operations; complex dot product operations; 32-bit bit count operations; complex conjugate multiply operations; and bit-wise Logical Operations, moves, adds and subtracts. The result may be written into an instruction specified register of global scalar register file 211, L1/S1 local register file 212, M1/N1 local register file 213 or D1/D2 local register file 214.

Scalar datapath side A 115 includes N1 unit 224. N1 unit 224 generally accepts two 64-bit operands and produces one 64-bit result. The two operands are each recalled from an instruction specified register in either global scalar register file 211 or M1/N1 local register file 213. N1 unit 224 preferably performs the same type operations as M1 unit 223. There may be certain double operations (called dual issued instructions) that employ both the M1 unit 223 and the N1 unit 224 together. The result may be written into an instruction specified register of global scalar register file 211, L1/S1 local register file 212, M1/N1 local register file 213 or D1/D2 local register file 214.

Scalar datapath side A 115 includes D1 unit 225 and D2 unit 226. D1 unit 225 and D2 unit 226 generally each accept two 64-bit operands and each produce one 64-bit result. D1 unit 225 and D2 unit 226 generally perform address calculations and corresponding load and store operations. D1 unit 225 is used for scalar loads and stores of 64 bits. D2 unit 226 is used for vector loads and stores of 512 bits. D1 unit 225 and D2 unit 226 preferably also perform: swapping, pack and unpack on the load and store data; 64-bit SIMD arithmetic operations; and 64-bit bit-wise logical operations. D1/D2 local register file 214 will generally store base and offset addresses used in address calculations for the corresponding loads and stores. The two operands are each recalled from an instruction specified register in either global scalar register file 211 or D1/D2 local register file 214. The calculated result may be written into an instruction specified register of global scalar register file 211, L1/S1 local register file 212, M1/N1 local register file 213 or D1/D2 local register file 214.

Vector datapath side B 116 includes L2 unit 241. L2 unit 241 generally accepts two 512-bit operands and produces one 512-bit result. The two operands are each recalled from an instruction specified register in either global vector register file 231, L2/S2 local register file 232 or predicate register file 234. L2 unit 241 preferably performs instruction similar to L1 unit 221 except on wider 512-bit data. The result may be written into an instruction specified register of global vector register file 231, L2/S2 local register file 232, M2/N2/C local register file 233 or predicate register file 234.

Vector datapath side B 116 includes S2 unit 242. S2 unit 242 generally accepts two 512-bit operands and produces one 512-bit result. The two operands are each recalled from an instruction specified register in either global vector register file 231, L2/S2 local register file 232 or predicate register file 234. S2 unit 242 preferably performs instructions similar to S1 unit 222 except on wider 512-bit data. The result may be written into an instruction specified register of global vector register file 231, L2/S2 local register file 232, M2/N2/C local register file 233 or predicate register file 234.

Vector datapath side B 116 includes M2 unit 243. M2 unit 243 generally accepts two 512-bit operands and produces one 512-bit result. The two operands are each recalled from an instruction specified register in either global vector register file 231 or M2/N2/C local register file 233. M2 unit 243 preferably performs instructions similar to M1 unit 223 except on wider 512-bit data. The result may be written into an instruction specified register of global vector register file 231, L2/S2 local register file 232 or M2/N2/C local register file 233.

Vector datapath side B 116 includes N2 unit 244. N2 unit 244 generally accepts two 512-bit operands and produces one 512-bit result. The two operands are each recalled from an instruction specified register in either global vector register file 231 or M2/N2/C local register file 233. N2 unit 244 preferably performs the same type operations as M2 unit 243. There may be certain double operations (called dual issued instructions) that employ both M2 unit 243 and the N2 unit 244 together. The result may be written into an instruction specified register of global vector register file 231, L2/S2 local register file 232 or M2/N2/C local register file 233.

Vector datapath side B 116 includes C unit 245. C unit 245 generally accepts two 512-bit operands and produces one 512-bit result. The two operands are each recalled from an instruction specified register in either global vector register file 231 or M2/N2/C local register file 233. C unit 245 preferably performs: "Rake" and "Search" instructions; up to 512 2-bit PN*8-bit multiplies I/Q complex multiplies per clock cycle; 8-bit and 16-bit Sum-of-Absolute-Difference (SAD) calculations, up to 512 SADs per clock cycle; horizontal add and horizontal min/max instructions; and vector permutes instructions. C unit 245 also contains 4 vector control registers (CUCR0 to CUCR3) used to control certain operations of C unit 245 instructions. Control registers CUCR0 to CUCR3 are used as operands in certain C unit 245 operations. Control registers CUCR0 to CUCR3 are preferably used: in control of a general permutation instruction (VPERM); and as masks for SIMD multiple DOT product operations (DOTPM) and SIMD multiple Sum-of-Absolute-Difference (SAD) operations. Control register CUCR0 is preferably used to store the polynomials for Galois Field Multiply operations (GFMPY). Control register CUCR1 is preferably used to store the Galois field polynomial generator function.

Vector datapath side B 116 includes P unit 246. P unit 246 performs basic logic operations on registers of local predicate register file 234. P unit 246 has direct access to read from and write to predication register file 234. These operations include AND, ANDN, OR, XOR, NOR, BITR, NEG, SET, BITCNT, RMBD, BIT Decimate and Expand. A commonly expected use of P unit 246 includes manipulation of the SIMD vector comparison results for use in control of a further SIMD vector operation.

Figure 3:
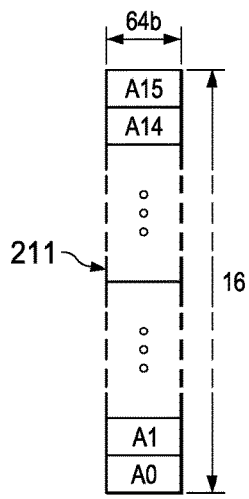
FIG. 3 illustrates a global scalar register file.

FIG. 3 illustrates global scalar register file 211. There are 16 independent 64-bit wide scalar registers designated A0 to A15. Each register of global scalar register file 211 can be read from or written to as 64-bits of scalar data. All scalar datapath side A 115 functional units (L1 unit 221, S1 unit 222, M1 unit 223, N1 unit 224, D1 unit 225 and D2 unit 226) can read or write to global scalar register file 211. Global scalar register file 211 may be read as 32-bits or as 64-bits and may only be written to as 64-bits. The instruction executing determines the read data size. Vector datapath side B 116 functional units (L2 unit 241, S2 unit 242, M2 unit 243, N2 unit 244, C unit 245 and P unit 246) can read from global scalar register file 211 via crosspath 117 under restrictions that will be detailed below.

Figure 4:
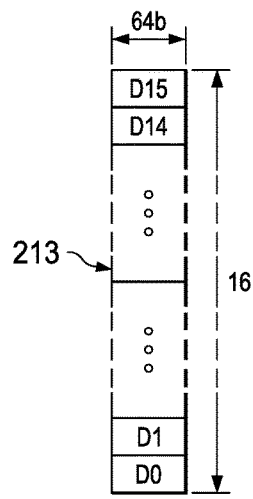
FIG. 4 illustrates a local scalar register file shared by arithmetic functional units.

FIG. 4 illustrates D1/D2 local register file 214. There are 16 independent 64-bit wide scalar registers designated D0 to D16. Each register of D1/D2 local register file 214 can be read from or written to as 64-bits of scalar data. All scalar datapath side A 115 functional units (L1 unit 221, S1 unit 222, M1 unit 223, N1 unit 224, D1 unit 225 and D2 unit 226) can write to global scalar register file 211. Only D1 unit 225 and D2 unit 226 can read from D1/D2 local scalar register file 214. It is expected that data stored in D1/D2 local scalar register file 214 will include base addresses and offset addresses used in address calculation.

Figure 5:
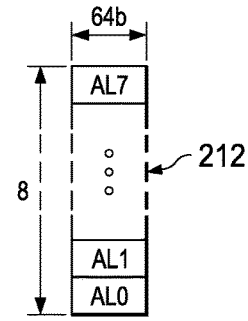
FIG. 5 illustrates a local scalar register file shared by multiply functional units.

FIG. 5 illustrates L1/S1 local register file 212. The embodiment illustrated in FIG. 5 has 8 independent 64-bit wide scalar registers designated AL0 to AL7. The preferred instruction coding (see FIG. 13) permits L1/S1 local register file 212 to include up to 16 registers. The embodiment of FIG. 5 implements only 8 registers to reduce circuit size and complexity. Each register of L1/S1 local register file 212 can be read from or written to as 64-bits of scalar data. All scalar datapath side A 115 functional units (L1 unit 221, S1 unit 222, M1 unit 223, N1 unit 224, D1 unit 225 and D2 unit 226) can write to L1/S1 local scalar register file 212. Only L1 unit 221 and S1 unit 222 can read from L1/S1 local scalar register file 212.

Figure 6:
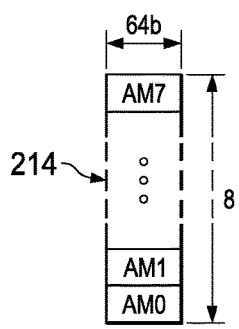
FIG. 6 illustrates a local scalar register file shared by load/store units.

FIG. 6 illustrates M1/N1 local register file 213. The embodiment illustrated in FIG. 6 has 8 independent 64-bit wide scalar registers designated AM0 to AM7. The preferred instruction coding (see FIG. 13) permits M1/N1 local register file 213 to include up to 16 registers. The embodiment of FIG. 6 implements only 8 registers to reduce circuit size and complexity. Each register of M1/N1 local register file 213 can be read from or written to as 64-bits of scalar data. All scalar datapath side A 115 functional units (L1 unit 221, S1 unit 222, M1 unit 223, N1 unit 224, D1 unit 225 and D2 unit 226) can write to M1/N1 local scalar register file 213. Only M1 unit 223 and N1 unit 224 can read from M1/N1 local scalar register file 213.

Figure 7:
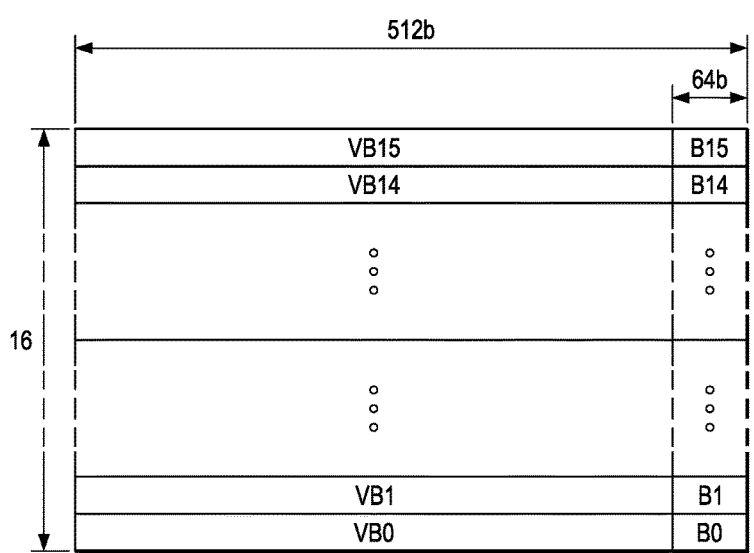
FIG. 7 illustrates a global vector register file.

FIG. 7 illustrates global vector register file 231. There are 16 independent 512-bit wide vector registers. Each register of global vector register file 231 can be read from or written to as 64-bits of scalar data designated B0 to B15. Each register of global vector register file 231 can be read from or written to as 512-bits of vector data designated VB0 to VB15. The instruction type determines the data size. All vector datapath side B 116 functional units (L2 unit 241, S2 unit 242, M2 unit 243, N2 unit 244, C unit 245 and P unit 246) can read or write to global vector register file 231. Scalar datapath side A 115 functional units (L1 unit 221, S1 unit 222, M1 unit 223, N1 unit 224, D1 unit 225 and D2 unit 226) can read from global vector register file 231 via crosspath 117 under restrictions that will be detailed below.

Figure 8:
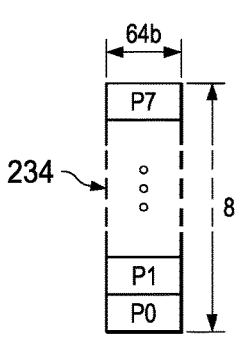
FIG. 8 illustrates a predicate register file.

FIG. 8 illustrates P local register file 234. There are 8 independent 64-bit wide registers designated P0 to P15. Each register of P local register file 234 can be read from or written to as 64-bits of scalar data. Vector datapath side B 116 functional units L2 unit 241, S2 unit 242, C unit 245 and P unit 246 can write to P local register file 234. Only L2 unit 241, S2 unit 242 and P unit 246 can read from P local register file 234. A commonly expected use of P local register file 234 includes: writing one bit SIMD vector comparison results from L2 unit 241, S2 unit 242 or C unit 245; manipulation of the SIMD vector comparison results by P unit 246; and use of the manipulated results in control of a further SIMD vector operation.

Figure 9:
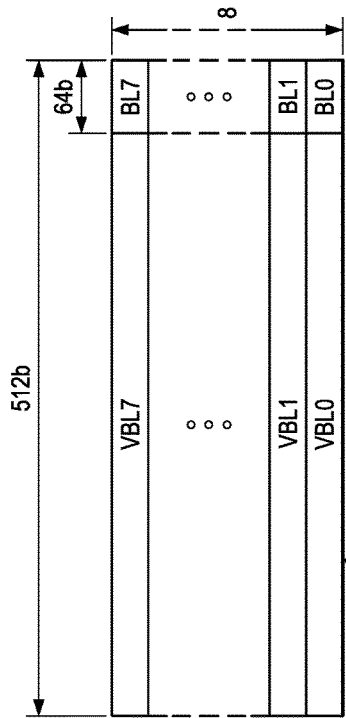
FIG. 9 illustrates a local vector register file shared by arithmetic functional units.

FIG. 9 illustrates L2/S2 local register file 232. The embodiment illustrated in FIG. 9 has 8 independent 512-bit wide vector registers. The preferred instruction coding (see FIG. 13) permits L2/S2 local register file 232 to include up to 16 registers. The embodiment of FIG. 9 implements only 8 registers to reduce circuit size and complexity. Each register of L2/S2 local vector register file 232 can be read from or written to as 64-bits of scalar data designated BL0 to BL7. Each register of L2/S2 local register file 232 can be read from or written to as 512-bits of vector data designated VBL0 to VBL7. The instruction type determines the data size. All vector datapath side B 116 functional units (L2 unit 241, S2 unit 242, M2 unit 243, N2 unit 244, C unit 245 and P unit 246) can write to L2/S2 local vector register file 232. Only L2 unit 241 and S2 unit 242 can read from L2/S2 local register file 232.

Figure 10:
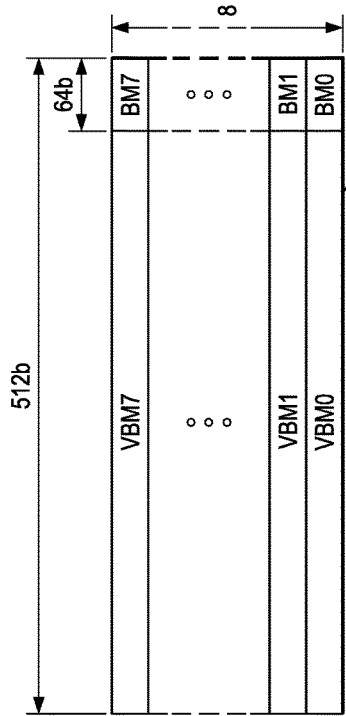
FIG. 10 illustrates a local vector register file shared by multiply and correlation functional units.

FIG. 10 illustrates M2/N2/C local register file 233. The embodiment illustrated in FIG. 10 has 8 independent 512-bit wide vector registers. The preferred instruction coding (see FIG. 13) permits M2/N2/C local register file 233 to include up to 16 registers. The embodiment of FIG. 10 implements only 8 registers to reduce circuit size and complexity. Each register of M2/N2/C local register file 233 can be read from or written to as 64-bits of scalar data designated BM0 to BM7. Each register of M2/N2/C local register file 233 can be read from or written to as 512-bits of vector data designated VBM0 to VBM7. All vector datapath side B 116 functional units (L2 unit 241, S2 unit 242, M2 unit 243, N2 unit 244, C unit 245 and P unit 246) can write to M2/N2/C local register file 233. Only M2 unit 243, N2 unit 244 and C unit 245 can read from M2/N2/C local register file 233.

Crosspath 117 permits limited exchange of data between scalar datapath side A 115 and vector datapath side B 116. During each operational cycle one 64-bit data word can be recalled from global scalar register file A 211 for use as an operand by one or more functional units of vector datapath side B 116 and one 64-bit data word can be recalled from global vector register file 231 for use as an operand by one or more functional units of scalar datapath side A 115. Any scalar datapath side A 115 functional unit (L1 unit 221, S1 unit 222, M1 unit 223, N1 unit 224, D1 unit 225 and D2 unit 226) may read a 64-bit operand from global vector register file 231. This 64-bit operand is the least significant bits of the 512-bit data in the accessed register of global vector register file 231. Plural scalar datapath side A 115 functional units may employ the same 64-bit crosspath data as an operand during the same operational cycle. However, only one 64-bit operand is transferred from vector datapath side B 116 to scalar datapath side A 115 in any single operational cycle. Any vector datapath side B 116 functional unit (L2 unit 241, S2 unit 242, M2 unit 243, N2 unit 244, C unit 245 and P unit 246) may read a 64-bit operand from global scalar register file 211. If the corresponding instruction is a scalar instruction, the crosspath operand data is treated as any other 64-bit operand. If the corresponding instruction is a vector instruction, the upper 448 bits of the operand are zero filled. Plural vector datapath side B 116 functional units may employ the same 64-bit crosspath data as an operand during the same operational cycle. Only one 64-bit operand is transferred from scalar datapath side A 115 to vector datapath side B 116 in any single operational cycle.

Streaming engine 125 transfers data in certain restricted circumstances. Streaming engine 125 controls two data streams. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have fixed sequence of elements. Thus programs cannot seek randomly within the stream. The stream data is read-only while active. Programs cannot write to a stream while simultaneously reading from it. Once a stream is opened streaming engine 125: calculates the address; fetches the defined data type from level two unified cache (which may require cache service from a higher level memory); performs data type manipulation such as zero extension, sign extension, data element sorting/swapping such as matrix transposition; and delivers the data directly to operand inputs of functional units of vector datapath B side 116. Streaming engine 125 is thus useful for real-time digital filtering operations on well-behaved data. Streaming engine 125 frees these memory fetch tasks from the corresponding CPU enabling other processing functions.

Streaming engine 125 provides the following benefits. Streaming engine 125 permits multi-dimensional memory accesses. Streaming engine 125 increases the available bandwidth to the functional units. Streaming engine 125 minimizes the number of cache miss stalls since the stream buffer bypasses level one data cache 123. Streaming engine 125 reduces the number of scalar operations required to maintain a loop. Streaming engine 125 manages address pointers. Streaming engine 125 handles address generation automatically freeing up the address generation instruction slots and D1 unit 225 and D2 unit 226 for other computations.

CPU 110 operates on an instruction pipeline. Instructions are fetched in instruction packets of fixed length further described below. All instructions require the same number of pipeline phases for fetch and decode, but require a varying number of execute phases.

Figure 11:
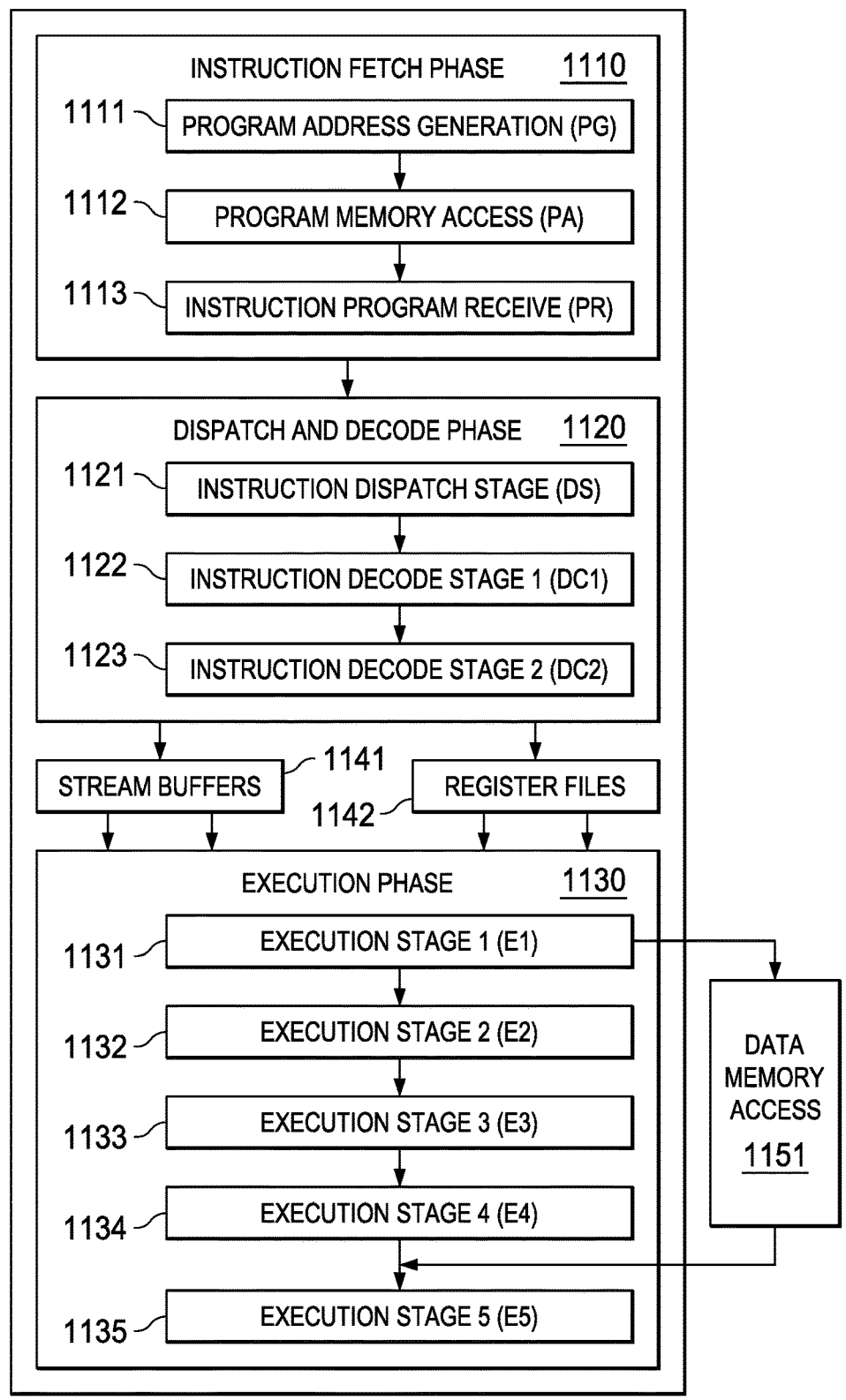
FIG. 11 illustrates pipeline phases of a central processing unit according to an embodiment of this invention.

FIG. 11 illustrates the following pipeline phases: program fetch phase 1110, dispatch and decode phases 1120 and execution phases 1130. Program fetch phase 1110 includes three stages for all instructions. Dispatch and decode phases 1120 include three stages for all instructions. Execution phase 1130 includes one to four stages dependent on the instruction.

Program fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache L1I. During the program access stage 1112 (PA) the level one instruction cache L1I processes the request, accesses the data in its memory and sends a fetch packet to the CPU boundary. During the program receive stage 1113 (PR) the CPU registers the fetch packet.

Figure 12:
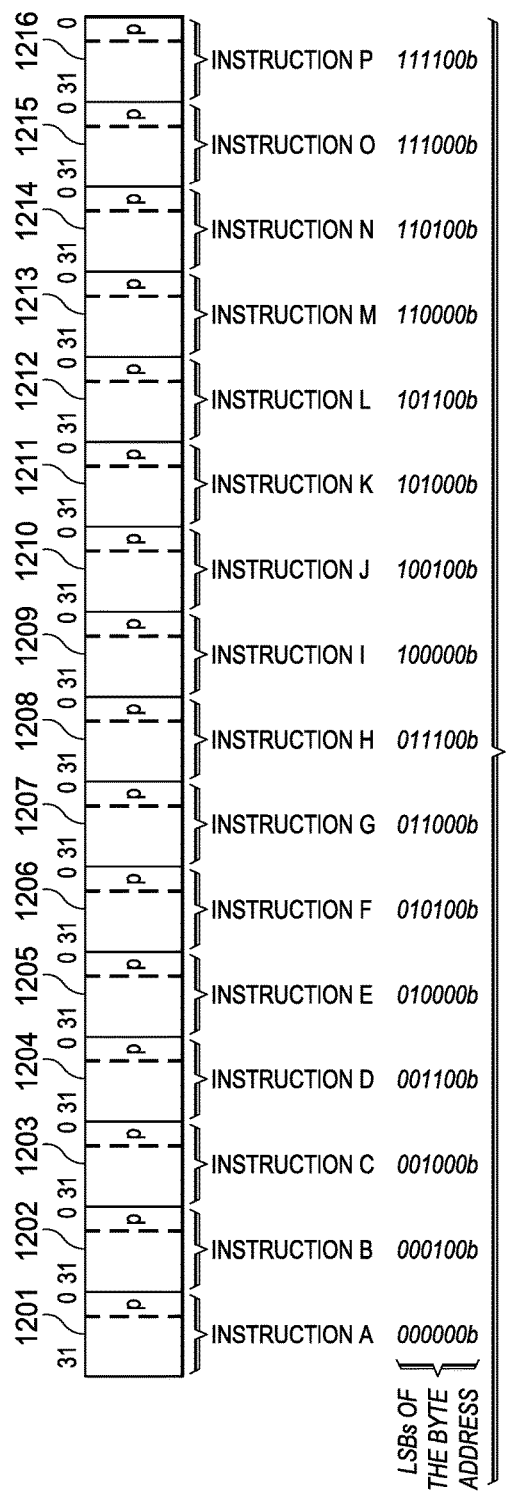
FIG. 12 illustrates sixteen instructions of a single fetch packet.

In the illustrated example, instructions are always fetched sixteen 32-bit wide slots, constituting a fetch packet, at a time. FIG. 12 illustrates 16 instructions 1201 to 1216 of a single fetch packet. Fetch packets are aligned on 512-bit (16-word) boundaries.

The execution of the individual instructions is partially controlled by a p bit in each instruction. This p bit is preferably bit 0 of the 32-bit wide slot. The p bit determines whether an instruction executes in parallel with a next instruction. The p bits are scanned from lower to higher address. If the p bit of an instruction is 1, then the next following instruction is executed in parallel with (in the same cycle as) that instruction. If the p bit of an instruction is 0, then the next following instruction is executed in the cycle after the instruction.

CPU 110 and level one instruction cache L1I 121 pipelines are de-coupled from each other. Fetch packet returns from level one instruction cache L1I can take different number of clock cycles, depending on external circumstances such as whether there is a hit in level one instruction cache 121 or a hit in level two combined cache 130. Therefore program access stage 1112 (PA) can take several clock cycles instead of 1 clock cycle as in the other stages.

The instructions executing in parallel constitute an execute packet. In the preferred embodiment an execute packet can contain up to fourteen instructions. No two instructions in an execute packet may use the same functional unit. A slot is one of five types: 1) a self-contained instruction executed on one of the functional units of CPU 110 (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246); 2) a unitless instruction such as a NOP (no operation) instruction or multiple NOP instruction; 3) a branch instruction; 4) a constant field extension; and 5) a conditional code extension. Some of these slot types will be further explained below.

Dispatch and decode phases 1110 include instruction dispatch to appropriate execution unit stage 1121 (DS), instruction pre-decode stage 1122 (DC1), and instruction decode, operand reads stage 1123 (DC2). During instruction dispatch to appropriate execution unit stage 1121 (DS), the fetch packets are split into execute packets and assigned to the appropriate functional units. During the instruction pre-decode stage 1122 (DC1), the source registers, destination registers, and associated paths are decoded for the execution of the instructions in the functional units. During the instruction decode, operand reads stage 1123 (DC2), more detailed unit decodes are done, as well as reading of operands from the register files.

Execution phases 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase 1111 is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the CPU boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

FIG. 13 illustrates an example of the instruction coding 1300 of functional unit instructions used by this invention. Each instruction consists of 32 bits and controls the operation of one of the individually controllable functional units (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246). The bit fields are defined as follows.

The creg field 1301 (bits 29 to 31) and the z bit 1302 (bit 28) are optional fields used in conditional instructions. These bits are used for conditional instructions to identify the predicate register and the condition. The z bit 1302 (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field 1301 and the z field 1302 are encoded in the instruction as shown in Table 1.

TABLE 1

| Conditional | creg | | | z |
|---|---|---|---|---|
| Register | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |
| A4 | 1 | 0 | 1 | z |
| A5 | 1 | 1 | 0 | z |
| Reserved | 1 | 1 | x | x |

Execution of a conditional instruction is conditional upon the value stored in the specified data register. This data register is in the global scalar register file 211 for all functional units. Note that "z" in the z bit column refers to the zero/not zero comparison selection noted above and "x" is a do-not-care state. This coding can only specify a subset of the 16 global registers as predicate registers. This selection was made to preserve bits in the instruction coding. Note that unconditional instructions do not have these optional bits. For unconditional instructions these bits in fields 1301 and 1302 (28 to 31) are preferably used as additional opcode bits.

The dst field 1303 (bits 23 to 27) specifies a register in a corresponding register file as the destination of the instruction results.

The src2 field 1304 (bits 18 to 22) specifies a register in a corresponding register file as the second source operand.

The src1/cst field 1305 (bits 13 to 17) has several meanings depending on the instruction opcode field (bits 2 to 12 for all instructions and additionally bits 28 to 31 for unconditional instructions). The first meaning specifies a register of a corresponding register file as the first operand. The second meaning is an immediate constant. Depending on the instruction type, this is treated as an unsigned integer and zero extended to a specified data length or is treated as a signed integer and sign extended to the specified data length.

The opcode field 1306 (bits 2 to 12) for all instructions (and additionally bits 28 to 31 for unconditional instructions) specifies the type of instruction and designates appropriate instruction options. This includes unambiguous designation of the functional unit used and operation performed. A detailed explanation of the opcode is beyond the scope of this invention except for the instruction options detailed below.

The s bit 1307 (bit 1) designates scalar datapath side A 115 or vector datapath side B 116. If s=0, then scalar datapath side A 115 is selected. This limits the functional unit to L1 unit 221, S1 unit 222, M1 unit 223, N1 unit 224, D1 unit 225 and D2 unit 226 and the corresponding register files illustrated in FIG. 2. Similarly, s=1 selects vector datapath side B 116 limiting the functional unit to L2 unit 241, S2 unit 242, M2 unit 243, N2 unit 244, P unit 246 and the corresponding register file illustrated in FIG. 2.

The p bit 1308 (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. In the illustrated examples, an execute packet can contain up to fourteen instructions. Each instruction in an execute packet must use a different functional unit.

There are two different condition code extension slots. Each execute packet can contain one each of these unique 32-bit condition code extension slots which contains the 4-bit creg/z fields for the instructions in the same execute packet. FIG. 14 illustrates the coding for condition code extension slot 0 and FIG. 15 illustrates the coding for condition code extension slot 1.

FIG. 14 illustrates the coding for condition code extension slot 0 having 32 bits. Field 1401 (bits 28 to 31) specify 4 creg/z bits assigned to the L1 unit 221 instruction in the same execute packet. Field 1402 (bits 27 to 24) specify 4 creg/z bits assigned to the L2 unit 241 instruction in the same execute packet. Field 1403 (bits 19 to 23) specify 4 creg/z bits assigned to the S1 unit 222 instruction in the same execute packet. Field 1404 (bits 16 to 19) specify 4 creg/z bits assigned to the S2 unit 242 instruction in the same execute packet. Field 1405 (bits 12 to 15) specify 4 creg/z bits assigned to the D1 unit 225 instruction in the same execute packet. Field 1406 (bits 8 to 11) specify 4 creg/z bits assigned to the D2 unit 226 instruction in the same execute packet. Field 1407 (bits 6 and 7) is unused/reserved. Field 1408 (bits 0 to 5) are coded a set of unique bits (CCEX0, 011101) to identify the condition code extension slot 0. Once this unique ID of condition code extension slot 0 is detected, the corresponding creg/z bits are employed to control conditional execution of any L1 unit 221, L2 unit 241, S1 unit 222, S2 unit 242, D1 unit 225 and D2 unit 226 instruction in the same execution packet. These creg/z bits are interpreted as shown in Table 1. Note that no execution packet can have more than one instruction directed to a particular execution unit. No execute packet of instructions can contain more than one condition code extension slot 0. Thus the mapping of creg/z bits to functional unit instruction is unambiguous. Setting the creg/z bits equal to "0000" makes the instruction unconditional. Thus a properly coded condition code extension slot 0 can make some instructions conditional and some unconditional.

FIG. 15 illustrates the coding for condition code extension slot 1 having 32 bits. Field 1501 (bits 28 to 31) specify 4 creg/z bits assigned to the M1 unit 223 instruction in the same execute packet. Field 1502 (bits 27 to 24) specify 4 creg/z bits assigned to the M2 unit 243 instruction in the same execute packet. Field 1503 (bits 19 to 23) specify 4 creg/z bits assigned to the C unit 245 instruction in the same execute packet. Field 1504 (bits 16 to 19) specify 4 creg/z bits assigned to the N1 unit 224 instruction in the same execute packet. Field 1505 (bits 12 to 15) specify 4 creg/z bits assigned to the N2 unit 244 instruction in the same execute packet. Field 1506 (bits 6 to 11) is unused/reserved. Field 1507 (bits 0 to 5) are coded a set of unique bits (CCEX1) to identify the condition code extension slot 1. Once this unique ID of condition code extension slot 1 is detected, the corresponding creg/z bits are employed to control conditional execution of any M1 unit 223, M2 unit 243, C unit 245, N1 unit 224 and N2 unit 244 instruction in the same execution packet. These creg/z bits are interpreted as shown in Table 1. If the corresponding instruction is conditional (includes creg/z bits) the corresponding bits in the condition code extension slot 1 override the condition code bits in the instruction. Note that no execution packet can have more than one instruction directed to a particular execution unit. No execute packet of instructions can contain more than one condition code extension slot 1. Thus the mapping of creg/z bits to functional unit instruction is unambiguous. Setting the creg/z bits equal to "0000" makes the instruction unconditional. Thus a properly coded condition code extension slot 1 can make some instructions conditional and some unconditional.

There are two different constant extension slots. Each execute packet can contain one each of these unique 32-bit constant extension slots which contains 27 bits to be concatenated as high order bits with the 5-bit constant field 1305 to form a 32-bit constant. As noted in the instruction coding description above only some instructions define the src1/cst field 1305 as a constant rather than a source register identifier. At least some of those instructions may employ a constant extension slot to extend this constant to 32 bits.

FIG. 16 illustrates the fields of constant extension slot 0. Each execute packet may include one instance of constant extension slot 0 and one instance of constant extension slot 1. FIG. 16 illustrates that constant extension slot 0 1600 includes two fields. Field 1601 (bits 5 to 31) constitute the most significant 27 bits of an extended 32-bit constant including the target instruction field 1305 as the five least significant bits. Field 1602 (bits 0 to 4) are coded a set of unique bits (CSTX0) to identify the constant extension slot 0. Constant extension slot 0 1600 can only be used to extend the constant of one of an L1 unit 221 instruction, data in a D1 unit 225 instruction, an S2 unit 242 instruction, an offset in a D2 unit 226 instruction, an M2 unit 243 instruction, an N2 unit 244 instruction, a branch instruction, or a C unit 245 instruction in the same execute packet. Constant extension slot 1 is similar to constant extension slot 0 except that bits 0 to 4 are coded a set of unique bits (CSTX1) to identify the constant extension slot 1. Constant extension slot 1 can only be used to extend the constant of one of an L2 unit 241 instruction, data in a D2 unit 226 instruction, an S1 unit 222 instruction, an offset in a D1 unit 225 instruction, an M1 unit 223 instruction or an N1 unit 224 instruction in the same execute packet.

Constant extension slot 0 and constant extension slot 1 are used as follows. The target instruction must be of the type permitting constant specification. Instruction decoder 113 determines this from the instruction opcode bits. The target instruction also includes one constant extension bit dedicated to signaling whether the specified constant is not extended (preferably constant extension bit=0) or the constant is extended (preferably constant extension bit=1). If instruction decoder 113 detects constant extension slot 0 or constant extension slot 1, it further checks the other instructions within that execute packet for an instruction corresponding to the detected constant extension slot. A constant extension is made only if one corresponding instruction has a constant extension bit equal to 1. An execute packet with a constant extension slot and two corresponding instructions marked constant extended (constant extension bit=1) is invalid.

Figure 17:
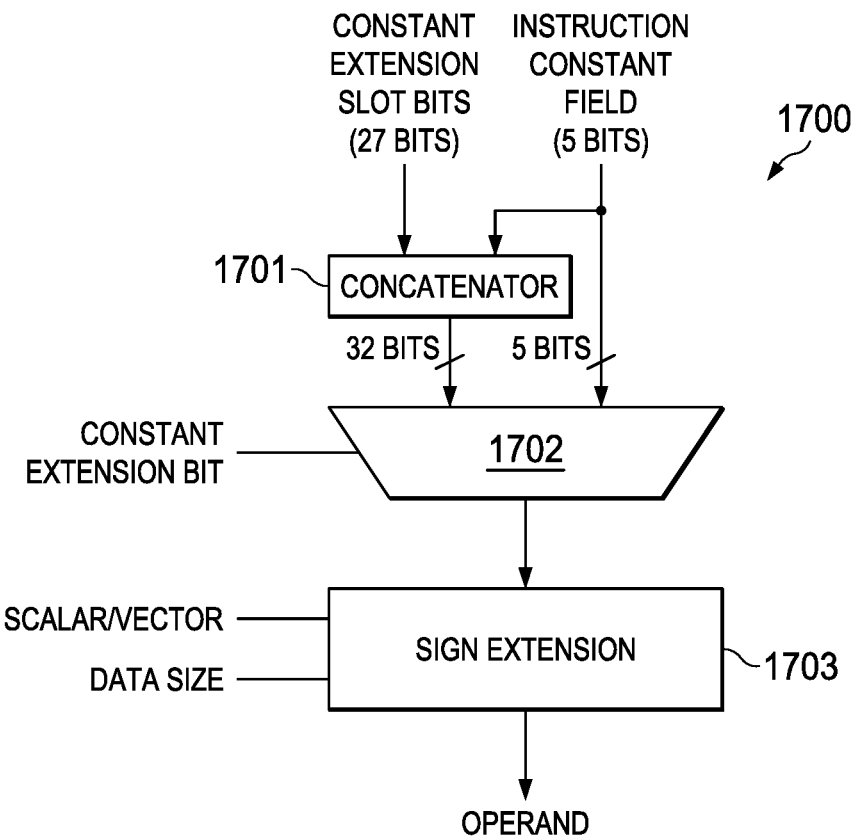
FIG. 17 is a partial block diagram illustrating constant extension.

FIG. 17 is a partial block diagram 1700 illustrating constant extension. FIG. 17 assumes that instruction decoder 113 detects a constant extension slot and a corresponding instruction in the same execute packet. Instruction decoder 113 supplies the 27 extension bits from the constant extension slot and the 5 constant bits from the corresponding instruction to concatenator 1701. Concatenator 1701 forms a single 32-bit word from these two parts. This combined 32-bit word is supplied to one input of multiplexer 1702. The 5 constant bits from the corresponding instruction field 1305 supply a second input to multiplexer 1702. Selection of multiplexer 1702 is controlled by the status of the constant extension bit. If the constant extension bit is 1 (extended), multiplexer 1702 selects the concatenated 32-but input. If the constant extension bit is 0 (not extended), multiplexer 1702 selects the 5 constant bits from the corresponding instruction field 1305. Multiplexer 1702 supplies this output to an input of sign extension unit 1703.

Sign extension unit 1703 forms the final operand value from the input from multiplexer 1703. Sign extension unit 1703 receives control inputs Scalar/Vector and Data Size. The Scalar/Vector input indicates whether the corresponding instruction is a scalar instruction or a vector instruction. The functional units of data path side A 115 (L1 unit 221, S1 unit 222, M1 unit 223, N1 unit 224, D1 unit 225 and D2 unit 226) can only perform scalar instructions. Any instruction directed to one of these functional units is a scalar instruction. Data path side B functional units L2 unit 241, S2 unit 242, M2 unit 243, N2 unit 244 and C unit 245 may perform scalar instructions or vector instructions. Instruction decoder 113 determines whether the instruction is a scalar instruction or a vector instruction from the opcode bits. P unit 246 may only perform scalar instructions. The Data Size may be 8 bits (byte B), 16 bits (half-word H), 32 bits (word W) or 64 bits (double word D).

Table 2 lists the operation of sign extension unit 1703 for the various options.

TABLE 2

| Instruction Type | Operand Size | Constant Length | Action |
| --- | --- | --- | --- |
| Scalar | B/H/W/D | 5 bits | Sign extend to 64 bits |
| Scalar | B/H/W/D | 32 bits | Sign extend to 64 bits |
| Vector | B/H/W/D | 5 bits | Sign extend to operand size and replicate across whole vector |
| Vector | B/H/W | 32 bits | Replicate 32-bit constant across each 32-bit (W) lane |
| Vector | D | 32 bits | Sign extend to 64 bits and replicate across each 64-bit (D) lane |

Special vector predicate instructions use registers in predicate register file 234 to control vector operations. In the current embodiment all these SIMD vector predicate instructions operate on selected data sizes. The data sizes may include byte (8 bit) data, half word (16 bit) data, word (32 bit) data, double word (64 bit) data, quad word (128 bit) data and half vector (256 bit) data. Each bit of the predicate register controls whether a SIMD operation is performed upon the corresponding byte of data. The operations of P unit 246 permit a variety of compound vector SIMD operations based upon more than one vector comparison. For example a range determination can be made using two comparisons. A candidate vector is compared with a first vector reference having the minimum of the range packed within a first data register. A second comparison of the candidate vector is made with a second reference vector having the maximum of the range packed within a second data register. Logical combinations of the two resulting predicate registers would permit a vector conditional operation to determine whether each data part of the candidate vector is within range or out of range.

L1 unit 221, S1 unit 222, L2 unit 241, S2 unit 242 and C unit 245 often operate in a single instruction multiple data (SIMD) mode. In this SIMD mode the same instruction is applied to packed data from the two operands. Each operand holds plural data elements disposed in predetermined slots. SIMD operation is enabled by carry control at the data boundaries. Such carry control enables operations on varying data widths.

Figure 18:
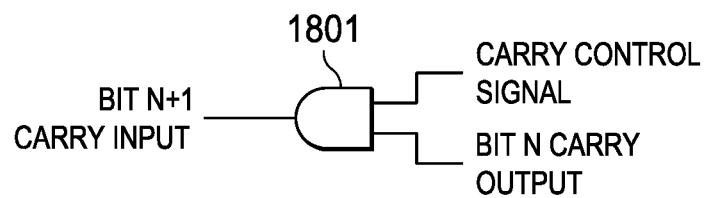
FIG. 18 illustrates the carry control for SIMD operations according to this invention.

FIG. 18 illustrates the carry control. AND gate 1801 receives the carry output of bit N within the operand wide arithmetic logic unit (64 bits for scalar datapath side A 115 functional units and 512 bits for vector datapath side B 116 functional units). AND gate 1801 also receives a carry control signal which will be further explained below. The output of AND gate 1801 is supplied to the carry input of bit N+1 of the operand wide arithmetic logic unit. AND gates such as AND gate 1801 are disposed between every pair of bits at a possible data boundary. For example, for 8-bit data such an AND gate will be between bits 7 and 8, bits 15 and 16, bits 23 and 24, etc. Each such AND gate receives a corresponding carry control signal. If the data size is of the minimum, then each carry control signal is 0, effectively blocking carry transmission between the adjacent bits. The corresponding carry control signal is 1 if the selected data size requires both arithmetic logic unit sections. Table 3 below shows example carry control signals for the case of a 512 bit wide operand such as used by vector datapath side B 116 functional units which may be divided into sections of 8 bits, 16 bits, 32 bits, 64 bits, 128 bits or 256 bits. In Table 3 the upper 32 bits control the upper bits (bits 128 to 511) carries and the lower 32 bits control the lower bits (bits 0 to 127) carries. No control of the carry output of the most significant bit is needed, thus only 63 carry control signals are required.

TABLE 3

| Data Size | Carry Control Signals |
| --- | --- |
| 8 bits (B) | –000 0000 0000 0000 0000 0000 0000 0000 0000 0000 0000 0000 0000 0000 0000 0000 |
| 16 bits (H) | –101 0101 0101 0101 0101 0101 0101 0101 0101 0101 0101 0101 0101 0101 0101 0101 |
| 32 bits (W) | –111 0111 0111 0111 0111 0111 0111 0111 0111 0111 0111 0111 0111 0111 0111 0111 |
| 64 bits (D) | –111 1111 0111 1111 0111 1111 0111 1111 0111 1111 0111 1111 0111 1111 0111 1111 |
| 128 bits | –111 1111 1111 1111 0111 1111 1111 1111 0111 1111 1111 1111 0111 1111 1111 1111 |
| 256 bits | –111 1111 1111 1111 1111 1111 1111 1111 0111 1111 1111 1111 1111 1111 1111 1111 |

It is typical in the art to operate on data sizes that are integral powers of 2 ($2^N$). However, this carry control technique is not limited to integral powers of 2. One skilled in the art would understand how to apply this technique to other data sizes and other operand widths.

The data overlap in sliding window block sum calculations should be exploited when employing a vector SIMD engine for better performance compared to a scalar engine. Summing elements within each column is easy via a simple vector addition across rows. Summing elements selectively within each row (horizontal sum) is difficult when employing a vector SIMD engine. This represents a bottleneck in improving performance for sliding window block sum computation for vector SIMD engines.

Figure 19:
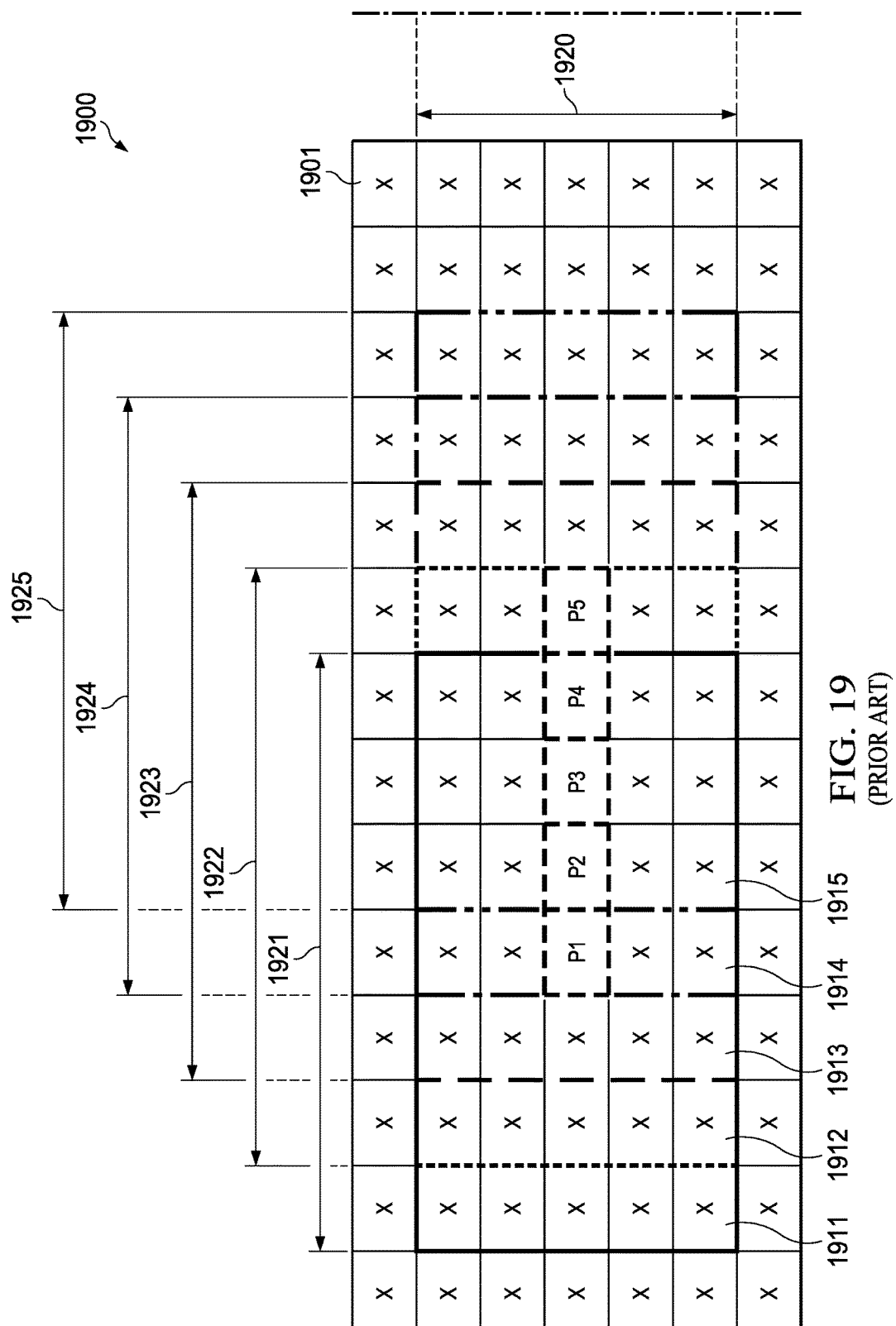
FIG. 19 illustrates an example of a sliding window sum computation of the prior art.

FIG. 19 illustrates an example of a sliding window sum computation. FIG. 19 illustrates portion 1900 of a video frame including plural pixels 1901. In FIG. 19 each box represents the data of a corresponding pixel 1901. FIG. 19 illustrates plural sliding windows each five pixels by seven pixels 1911, 1912, 1913, 1914 and 1915. Window 1911 centered about pixel P1 has a vertical extent 1920 and a horizontal extent 1921. Window 1912 centered about pixel P2 has a vertical extent 1920 and a horizontal extent 1922. Window 1913 centered about pixel P3 has a vertical extent 1920 and a horizontal extent 1923. Window 1914 centered about pixel P4 has a vertical extent 1920 and a horizontal extent 1914. Window 1915 centered about pixel P5 has a vertical extent 1920 and a horizontal extent 1925. Note the sliding window size illustrated in FIG. 19 is exemplary only, larger or smaller windows are feasible.

Figure 20:
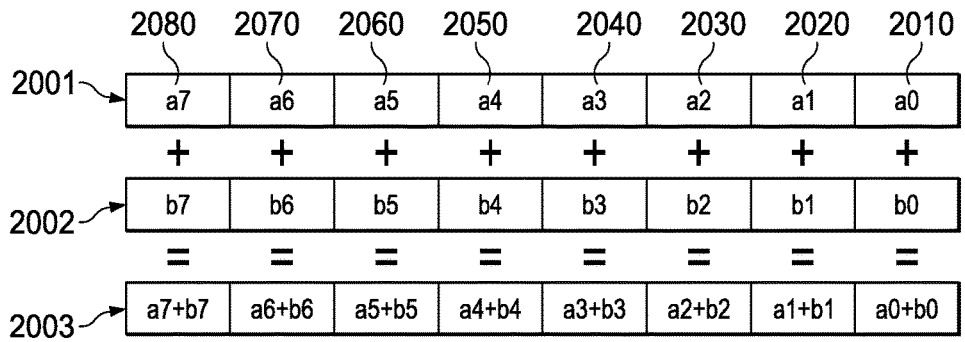
FIG. 20 illustrates one aspect of such a sliding window sum including a SIMD vector sum operation.

The algorithm to be executed with the sliding windows 1911, 1912, 1913, 1914 and 1915 is the sum of the pixel values in the whole sliding window. FIG. 20 illustrates one aspect of such a sliding window sum. FIG. 20 schematically illustrates a SIMD vector sum operation. Source registers 2001 and 2002 each hold SIMD data in lanes 2010, 2020, 2030, 2040, 2050, 2060, 2070 and 2080. Performing a SIMD sum operation results in the respective SIMD source values summed in destination register 2003 as shown in FIG. 20. An initial step in summing all pixel values in a sliding window is summing the rows. A first operation is a SIMD sum of the first two rows. A second operation is a SIMD sum of the prior sum and the third row. This continues performing a SIMD sum of the prior sum and the next row until reaching the last row in the sliding window. The resulting SIMD sum is the sum of each column in the sliding window in a corresponding SIMD lane. FIG. 20 illustrates eight SIMD lanes in accordance with the general practice of data sizes that are integral powers of 2 ($2^N$) generally resulting in $2^N$ SIMD lanes. FIG. 20 is an example of a SIMD sum instruction that may be used for forming a sliding window sum. The SIMD lane size should be selected at least as great as the pixel value size. SIMD lanes unused for the current sliding window sum may be zero filled or may be employed for another sliding window sum computation.

Prior art data processors do not include a horizontal SIMD sum instruction summing the values in each SIMD lane within a single operand. In absence of such a horizontal SIMD, addition of elements can occur only across vectors and not within a vector. The prior art includes two techniques to form the horizontal sum required to compute a sliding window sum.

Figure 21:
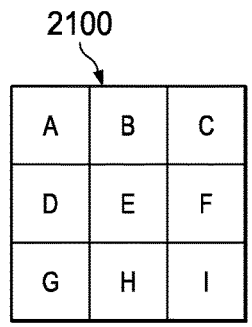
FIG. 21 illustrates an exemplary 3 by 3 window with individual elements labeled for ease of reference.
Figure 22:
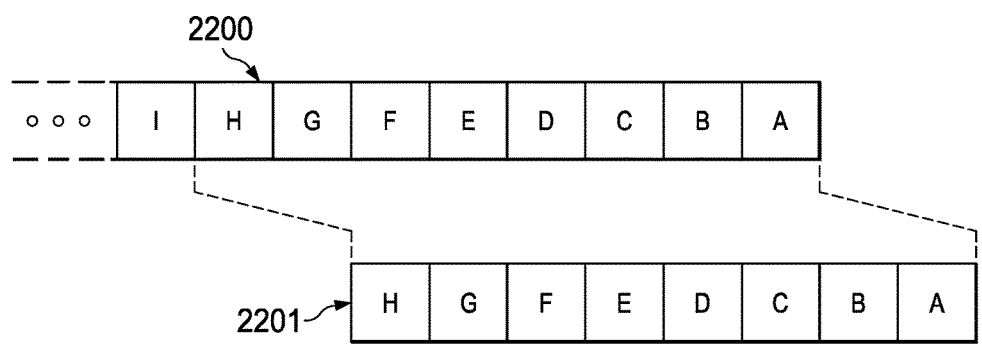
FIG. 22 illustrates an order of disposition of the elements A through I in memory.
Figure 23:
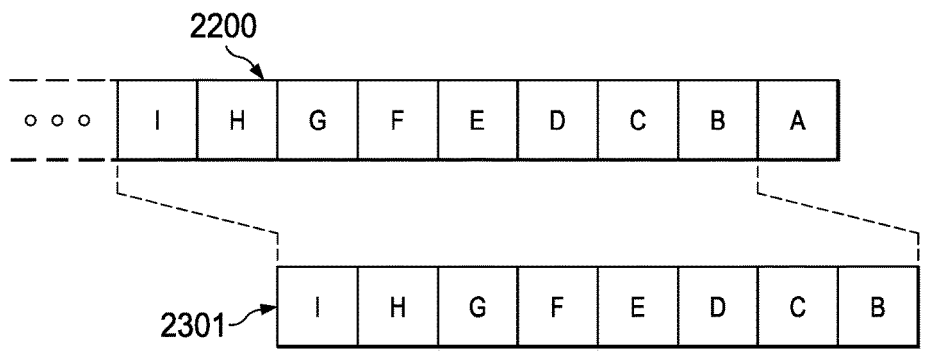
FIG. 23 illustrates a second vector load of an example operation.
Figure 24:
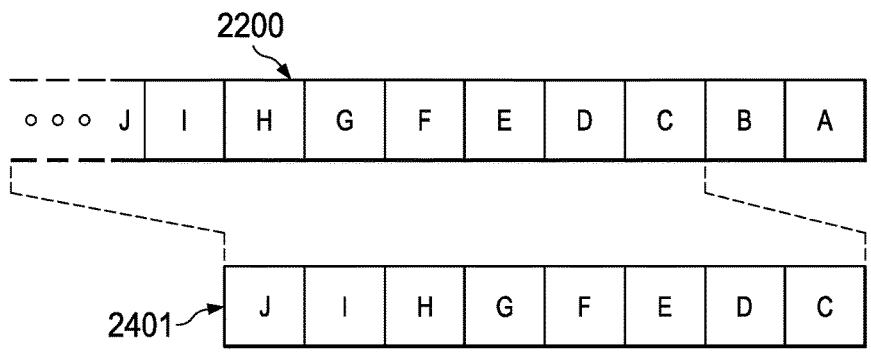
FIG. 24 illustrates a third vector load of an example operation.
Figure 25:
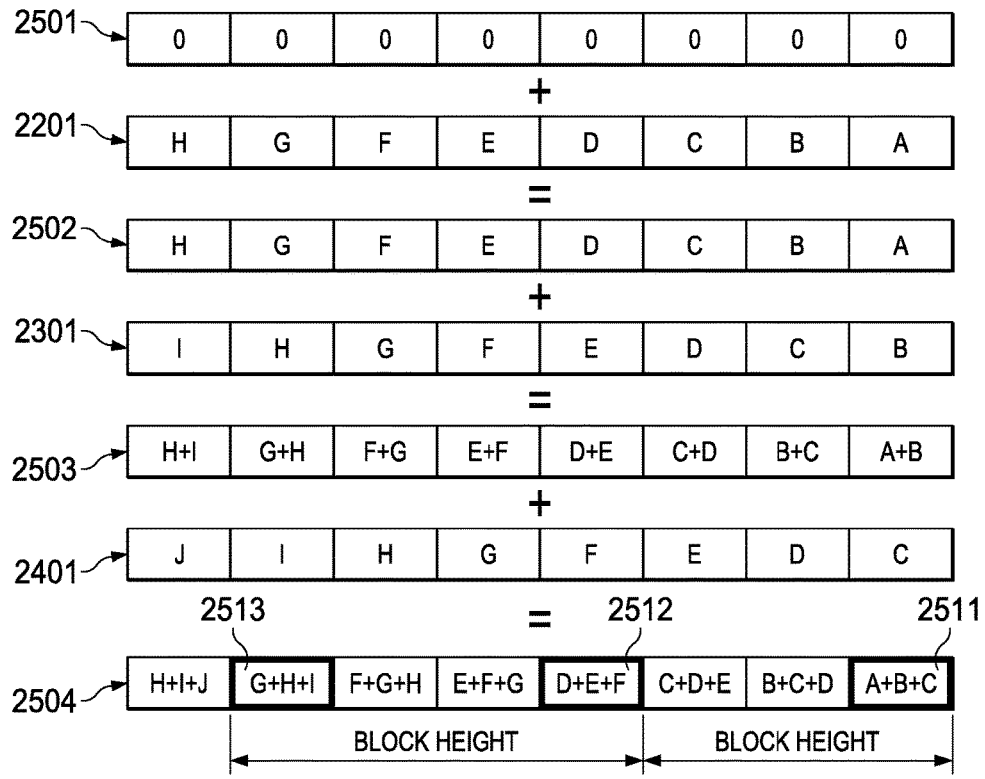
FIG. 25 illustrates the values of a running sum upon initialization, at intermediate steps and the final value.
Figure 26:
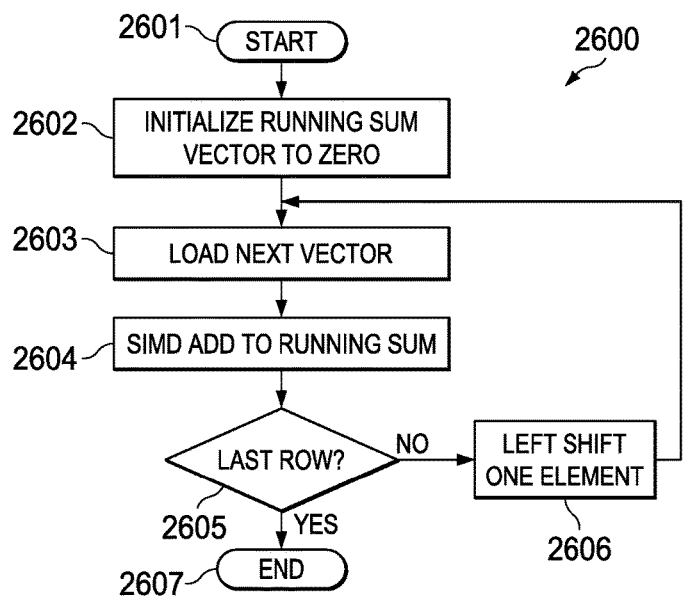
FIG. 26 is a flow chart outlining a prior art technique.

FIGS. 21 to 26 illustrate an example of a first of these prior art techniques. This first prior art technique converts the horizontal addition into a vertical addition. This conversion helps in sliding block sum computation because it requires only simple vector add instructions. FIG. 21 illustrates an exemplary 3 by 3 window with individual elements A through I labeled for ease of reference. FIGS. 22 to 24 illustrate three exemplary vector load operations used in this prior art technique. FIG. 25 illustrates the values of the running sum upon initialization, at intermediate steps and the final value. FIG. 26 is a flow chart 2600 outlining this prior art technique.

FIG. 21 illustrates an exemplary 3 by 3 window. This horizontal addition problem requires calculation of A+B+C, D+E+F and G+H+I. FIG. 22 illustrates the elements A through I disposed in memory in an order 2200. This prior art technique begins with start block 2601 (FIG. 26). Next processing block 2601 initializes a running sum variable to zero. Variable 2501 (FIG. 25) illustrates an eight lane SIMD variable with each SIMD lane set to zero. Depending on the relationship between the element data size and the register and functional unit size of vector data path B 116 (FIG. 1) there could be more or fewer SIMD lanes. Block 2603 performs a next vector load. For the first iteration of this loop, the next vector load is the first vector load. FIG. 22 illustrates the first vector load of this example. The first vector load loads element A, B, C, D, E, F, G and H into register 2201. This is treated as an eight lane SIMD variable the same as initialized running sum 2501. Block 2604 sums the newly loaded vector quantity with the running sum. Intermediate running sum 2502 (FIG. 25) illustrates the result of sum.

Test block 2605 determines whether the just completed sum corresponds to the last row. If not (No at test block 2605), then block 2606 left shifts the vector load parameters by one element.

Block 2603 performs a next vector load at the newly calculated location. FIG. 23 illustrates the second vector load of this example which loads element B, C, D, E, F, G, H and I into register 2301. Block 2604 sums the newly loaded vector quantity with the running sum. Intermediate running sum 2503 (FIG. 25) illustrates the result of sum. Note each SIMD lane includes the sum of corresponding lanes of registers 2201 and 2301.

Test block 2605 determines whether the just completed sum corresponds to the last row. If not (No at test block 2605), then block 2606 left shifts the vector load parameters by one element.

Block 2603 performs a next vector load at the newly calculated location. FIG. 24 illustrates the third vector load of this example which loads element C, D, E, F, G, H, I and J (not within the original 3 by 3 window) into register 2401. Block 2604 sums the newly loaded vector quantity with the running sum. Running sum 2503 illustrates the result of sum. Note each SIMD lane includes the sum of corresponding lanes of registers 2201, 2301 and 2401.

Test block 2605 determines whether the just completed sum corresponds to the last row. If true (Yes at test block 2605), then process 2600 ends at end block 2607. The final running sum 2504 includes the horizontal sums needed. As illustrated in FIG. 25, SIMD lane 2511 includes the first row sum A+B+C, SIMD lane 2512 includes the second row sum D+E+F and SIMD lane 2513 includes the third row sum G+H+I. Note that the element distance between SIMD lane 2511 and SIMD land 2512 and between SIMD lane 2512 and SIMD lane 2513 is the block height (3 in this example).

Once horizontal sums corresponding to each element for the given block width has been computed, next step involves addition of these horizontal sums for the given block height (vertical sum) to compute block sum corresponding to each element. The resultant running sum of the horizontal sums may are stored. The steps involved for sliding window block sum computation are similar to FIG. 26 except the shift in step 2606 is by the block width. This aligns the correct elements of the SIMD resultant 2504 for column summing. This loop repeats for the block height resulting the sum of all window values.

This prior art technique has some serious shortcomings. The horizontal to vertical sum conversion trick, requires vector loads address offsets of just one element. This results in almost no re-use of prior loaded data. This does not effectively use the strength of a Vector SIMD engine in accelerating performance of the algorithm in question. This technique requires too many memory accesses due to this lack of re-use of loaded data. Thus many memory operations are needed resulting in large performance overhead.

Figure 27:
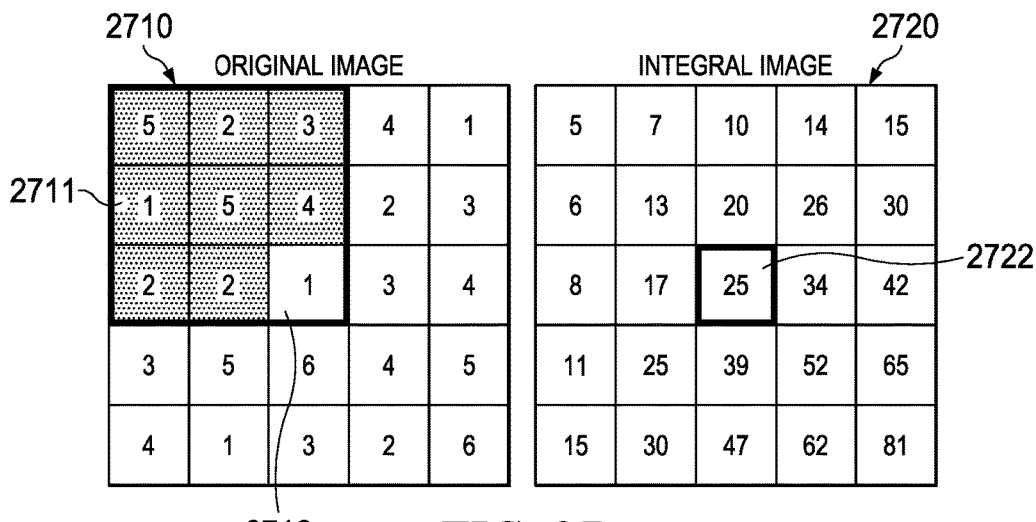
FIG. 27 illustrates the relationship between element values in an image and a corresponding integral image.
Figure 28:
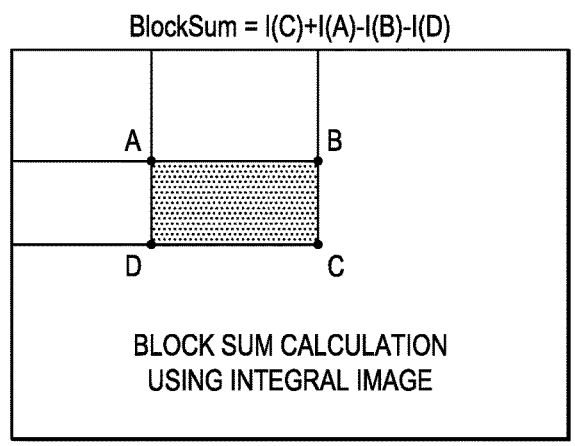
FIG. 28 illustrates a way of calculating the sum of pixel values in a given image from the integral values.

FIGS. 27 and 28 illustrate an example of a second of these prior art techniques. FIG. 27 illustrates the relationship between element values in an image 2701 and an integral image 2702. The value of each element in integral image 2702 is the sum the element and of all elements above and to the left of the element. Note window 2711 in image 2710. The value of element 2711 in image 2710 is 1. The value of element 2722 in integral image 2720 is 25. This is the sum of 5, 2, 3, 1, 5, 4, 2, 2 and 1. All other values of integral image 2720 are derived similarly.

If there is an integral image available, this enables a quick and effective way of calculating the sum of values (pixel values) in a given image or rectangular subset of a grid. Thus integral image can be used for calculating sliding window block sum as well. This calculation is illustrated in FIG. 28. This technique employs the integral values at the four corners of the window I(A), I(B), I(C) and I(D). Using Integral Image, block sum may be computed as depicted below:

Block Sum=$I(C)+I(A)-I(B)-I(C)$

Since a block sum can be computed using an integral image, the block sum can also be used to compute a sliding window block sum. This approach has many shortcomings. For large images, calculation of an integral image is a time-consuming procedure. Thus, a sliding window block sum over the integral image results in large computation cost. Separate vector loads for integral image values at A, B, C and D are needed. This does not encourage data re-use. For example, points C and D for the current block will be points A and B for another block. This algorithm does not make re-use of recalled data easy. The inherent nature of integral image prevents re-use of one block sum to calculate the next adjacent block sum for the sliding window. Instead this algorithm calls for a load of the integral image values for points A, B, C and D for the adjacent block. Integral image calculation results in higher memory usage. The data type used for original image will typically not suffice for integral images.

Figure 29:
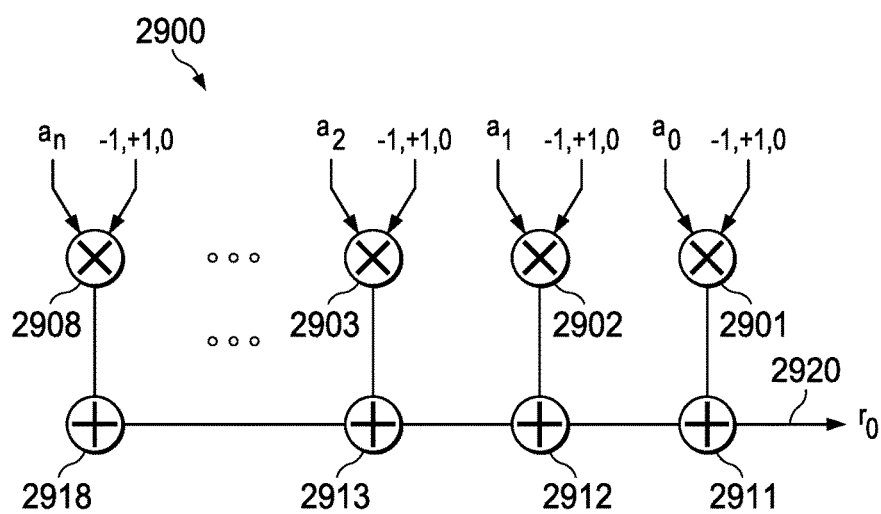
FIG. 29 schematically illustrates the operation of the VDOTPMPN instruction.

This invention employs an instruction called Vector Dot Product Mask Positive Negative (VDOTPMPN). This invention employs a sliding window block sum using instruction based selective horizontal addition. An example of a typical instruction that supports selective horizontal addition is the VDOTPMPN instruction (Vector DOT Product Mask Positive Negative). This instruction supports addition of elements within a vector. The mask may be used to specify which elements within the vector need to be added to produce each element in the resultant sum vector. This instruction produces multiple such sums from a single vector. FIG. 29 schematically illustrates the operation of the VDOTPMPN instruction.

The dot product of two vectors $A=[A_1, A_2, \ldots, A_n]$ and $B=[B_1, B_2, \ldots, B_n]$ is defined as:

$$A \cdot B = \sum_{i=1}^{n} A_i B_i = A_1 B_1 + A_2 B_2 + \ldots A_n B_n$$

where: n is the dimension of the vectors. The VDOTPMPN includes a mask operand that is 1, 0 or −1 for each vector element. Proper use of this mask enables control over the number of terms and selection of addition or subtraction.

The horizontal sum corresponding to each element for the given block width can be calculated easily using the VDOTPMPN instruction. The mask needs to be prepared such that the right set of elements needs to be selected for this purpose. For a sliding window block sum, the block width remains the same throughout the image. Thus the mask can be pre-computed and stored. The mask preparation therefore does not result in any performance loss.

Figure 30:
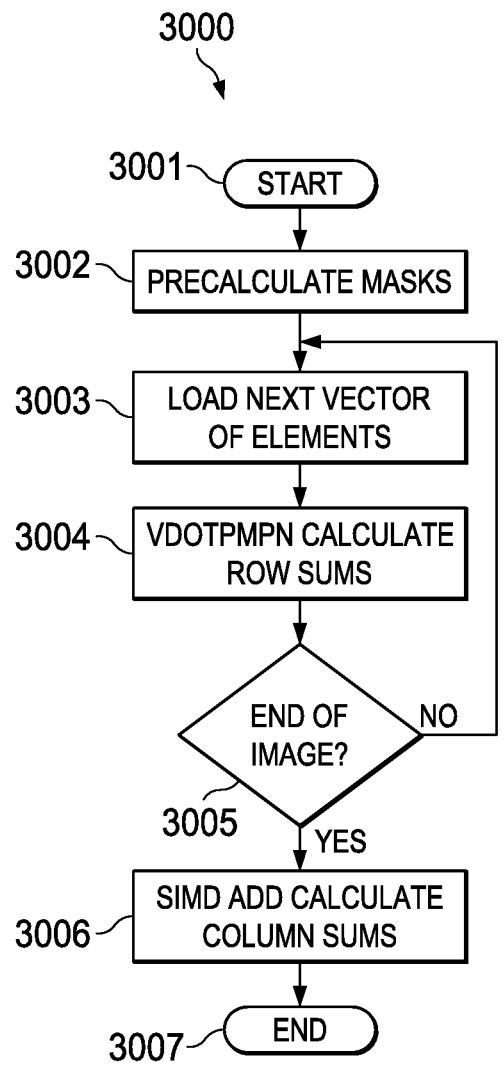
FIG. 30 is a flow chart illustrating the process of this invention.

FIG. 30 is a flow chart illustrating process 3000 of this invention. Process 3000 begins at start block 3001. Process 3000 precalculates the masks as noted above in block 3002. Process 3000 then loads the next vector of picture elements into a vector register in block 3003. For the first pass through the loop, the next vector of picture elements is the first vector of picture elements.

Figure 31:
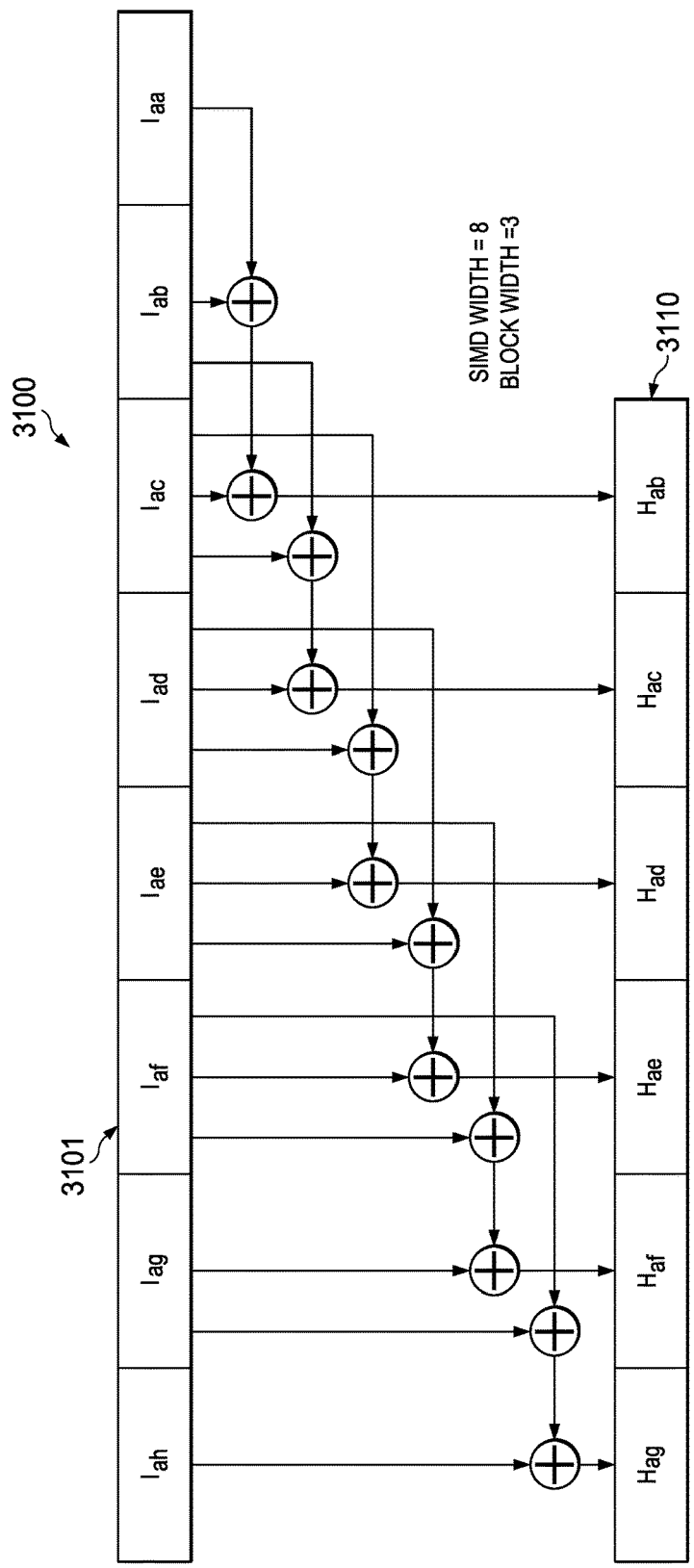
FIG. 31 illustrates using a VDOTPMPN instruction for a horizontal sum of an example having an eight element vector length for a block sum of a 3×3 block.

Process 3000 then calculates row sums using a VDOTPMPN instruction in block 3004. This process is illustrated in FIG. 31 for an example of eight element vector length for a block sum of a 3×3 block. Vector 3101 illustrates eight elements packed in the vector register $I_{aa}, I_{ab} \ldots I_{ah}$. Each element of resultant vector 3110 is the sum of three elements of vector 3101. As illustrated in FIG. 31: element $H_{ab}$ is the sum of $I_{aa}, I_{ab}$ and $I_{ac}$; element $H_{ac}$ is the sum of $I_{ab}, I_{ac}$ and $I_{ad}$; element $H_{ad}$ is the sum of $I_{ac}, I_{ad}$ and $I_{ae}$; element $H_{ae}$ is the sum of $I_{ad}, I_{ae}$ and $I_{af}$; element $H_{af}$ is the sum of $I_{ae}, I_{af}$ and $I_{ag}$; and element $H_{ag}$ is the sum of $I_{af}, I_{ag}$ and $I_{ah}$. As required each row sum spans the three column image size.

Decision block 3005 determines if the row sums of the entire image have been processed. The image size is typically larger than the block size of the block sum. Thus more than one pass using the VDOTPMPN instruction (block 3004) is generally required. If the image has not been completely traversed (No at decision block 3005), then process 3000 advances to block 3003 to load the next vector of elements.

Figure 32:
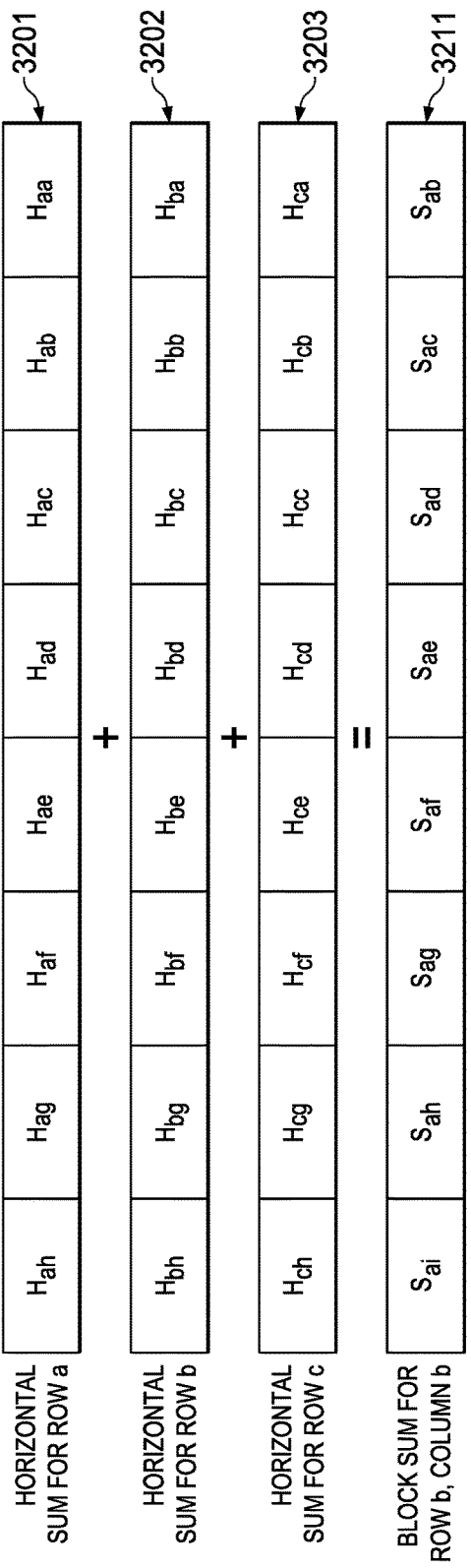
FIG. 32 illustrates using SIMD add for a vertical sum in the 3×3 block sum example.

If the image has been completely traversed (Yes at decision block 3005), then process 3000 advances to block 3006 to compute the column sums. This process is illustrated in FIG. 32. Vectors 3201, 3202 and 3203 are row sums from block 3004. Vector 3211 is a SIMD sum of the corresponding row sums. Though only a single operation is shown in FIG. 32, in a practical embodiment a SIMD sum instruction will generally support only two input operands. The larger sum illustrated in FIG. 32 would be formed from plural SIMD add operations such as:

Intermediate Sum=SIMD ADD(3201+3202); and

Final Sum=SIMD Add(Intermediate Sum+3203).

The number of intermediate sums needed depends on the column with of the block to be summed. For sliding window sums data re-use is maximized using a single running sum. SIMD addition is performed for each row of horizontal sums is performed to the running sum, the horizontal sum for the row just above the block height for the current element may be subtracted from the running sum. Upon completion of the column sums process 3000 is complete and ends at end block 3007.

This solution is simple and straightforward and has the following advantages. The row sum calculation is simplified using Horizontal SIMD. Because the block size is fixed for the sliding window, the weights to be applied for VDOTPMPN instruction can be pre-computed. This solution encourages maximum re-use of once loaded data. This solution thus reduces the frequency of memory accesses.

Using VDOTPMPN instruction restricts calculation to less than the SIMD width of data at a time depending on the block size required. Thus this solution produces less data than it consumes. This restricts operation to less than the full vector bandwidth. The strengths of this solution more than offsets the shortcoming, resulting in significantly enhanced performance for computation of sliding window block sum.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results unless such order is recited in one or more claims. In certain circumstances, multitasking and parallel processing may be advantageous. Moreover, the separation of various system components in the embodiments described above should not be understood as requiring such separation in all embodiments.

What is claimed is:

1. A method for computing a sliding window block sum for a matrix of picture elements having a size M×N, the method comprising:
   using a processor to:
      for each picture element in the matrix:
         determine a block sum for a window having a size m×n around the picture element, wherein M>m and N>n, and wherein determining the block sum comprises:
            for each row of the window, performing a vector dot product operation based on a vector of packed picture elements corresponding to the row and a mask that is determined based at least partially on a horizontal size of the window to determine a respective vector of masked horizontal element sums; and
            after determining the respective vector of masked horizontal element sums for each row of the window, performing a vector single instruction multiple data (SIMD) addition operation to sum the respective vectors of masked horizontal element sums for each row of the window to determine the block sum of the window that corresponds to the picture element; and
      replace each picture element in the matrix with the block sum of the window corresponding to the picture element to obtain the sliding window block sum of the matrix.

2. The method of claim 1, wherein:
   M is an integer number corresponding to a width of the matrix;
   N is an integer number corresponding to a height of the matrix;
   m is an integer number corresponding to a width of the window; and
   n is an integer number corresponding to a height of the window.

3. The method of claim 1, wherein:
   M represents the number of columns in the matrix;
   N represents the number of rows in the matrix;
   m represents the number of columns in the window; and
   n represents the number of rows in the window.

4. The method of claim 1, wherein the mask is determined based additionally on a vector size of the packed picture elements.

5. The method of claim 1, wherein the mask comprises a respective bit for each picture element.

6. The method of claim 5, wherein the respective bit for each picture element is selectable as either a first value that indicates an addition operation, a second value that indicates a subtraction operation, and a third value that indicates the picture element should not be selected.

7. The method of claim 1, wherein summing the vectors of masked horizontal element sums comprises:
   summing first and second vectors of masked horizontal element sums to form a first sum; and
   then summing an additional vector of masked horizontal element sums with the first sum forming a second sum.

8. The method of claim 7, wherein, when n>3, the first and second sums are intermediate sums.

9. The method of claim 7, wherein, when the additional vector of masked horizontal element sums corresponds to a last row of the window, the second sum is the block sum of the window.

10. The method of claim 1, wherein the processor comprises a digital signal processor.

11. The method of claim 1, wherein the window is centered around the picture element.

12. An electronic device comprising:
   a processor; and
   a memory to store image data, the image data including a matrix of picture elements having a size M×N, and instructions for determining a sliding window block sum of the matrix that, when executed by the processor, causes the processor to:
      for each picture element in the matrix:
         determine a block sum for a window having a size m×n around the picture element, wherein M>m and N>n, and wherein determining the block sum comprises:
            for each row of the window, performing a vector dot product operation based on a vector of packed picture elements corresponding to the row and a mask that is determined based at least partially on a horizontal size of the window to determine a respective vector of masked horizontal element sums; and
            after determining the respective vector of masked horizontal element sums for each row of the window, performing a vector single instruction multiple data (SIMD) addition operation to sum the respective vectors of masked horizontal element sums for each row of the window to determine the block sum of the window that corresponds to the picture element; and
      replace each picture element in the matrix with the block sum of the window corresponding to the picture element to obtain the sliding window block sum of the matrix.

13. The electronic device of claim 12, wherein:
   M is an integer number that represents the number of columns in the matrix;
   N is an integer number that represents the number of rows in the matrix;
   m is an integer number that represents the number of columns in the window; and
   n is an integer number that represents the number of rows in the window.

14. The electronic device of claim 12, wherein the mask is determined based additionally on a vector size of the packed picture elements.

15. The electronic device of claim 12, wherein the mask comprises a respective bit for each picture element, wherein the respective bit for each picture element is selectable as either a first value that indicates an addition operation, a second value that indicates a subtraction operation, and a third value that indicates the picture element should not be selected.

16. The electronic device of claim 12, wherein the processor comprises a digital signal processor.

17. The electronic device of claim 12, wherein the processor is configured to sum the vectors of masked horizontal element sums by:
   summing first and second vectors of masked horizontal element sums to form a first sum; and
   then summing an additional vector of masked horizontal element sums with the first sum forming a second sum.

18. The electronic device of claim 17, wherein, when n>3, the first and second sums are intermediate sums.

19. The electronic device of claim 17, wherein, when the additional vector of masked horizontal element sums corresponds to a last row of the window, the second sum is the block sum of the window.

20. The electronic device of claim 12, wherein the window has a size of m=3 and n=3.

* * * * *